(12) United States Patent
Li et al.

(10) Patent No.: US 12,571,896 B2
(45) Date of Patent: Mar. 10, 2026

(54) ASYMMETRICAL FREQUENCY-DIVISION MULTIPLEXING FOR RADAR SYSTEMS

(71) Applicant: Aptiv Technologies AG, Schaffhausen (CH)

(72) Inventors: Zhengzheng Li, Agoura Hills, CA (US); Stuart Rogers, Oak Park, CA (US); Le Zheng, Monterey Park, CA (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 463 days.

(21) Appl. No.: 17/932,608

(22) Filed: Sep. 15, 2022

(65) Prior Publication Data

US 2023/0324531 A1    Oct. 12, 2023

Related U.S. Application Data

(60) Provisional application No. 63/364,223, filed on May 5, 2022, provisional application No. 63/362,030, filed on Mar. 28, 2022.

(51) Int. Cl.
*G01S 13/00*        (2006.01)
*G01S 13/931*       (2020.01)
(Continued)

(52) U.S. Cl.
CPC .......... *G01S 13/003* (2013.01); *G01S 13/931* (2013.01); *H04B 7/0413* (2013.01); *G01S 2013/93271* (2020.01)

(58) Field of Classification Search
CPC ................ G01S 13/003; G01S 13/931; G01S 2013/93271; G01S 7/0232; G01S 7/2927;
(Continued)

(56) References Cited

U.S. PATENT DOCUMENTS 5,576,652 A  * 11/1996  Boehlke ................ H03H 17/08
                                              327/175
7,430,254 B1     9/2008  Anderson
                     (Continued)

FOREIGN PATENT DOCUMENTS

CN        108111278 A    6/2018
EP          3598170 A1   1/2020
EP          3835810 A1   6/2021

OTHER PUBLICATIONS

Colannino, J. (2003) Modular and Regular Golomb Rulers, Modular and regular Golomb rulers. Available at: https://cgm.cs.mcgill. ca/~athens/cs507/Projects/2003/JustinColannino/ (Accessed: Jul. 9, 2025). (Year: 2003).*

(Continued)

*Primary Examiner* — Vladimir Magloire
*Assistant Examiner* — Remash R Guyah
(74) *Attorney, Agent, or Firm* — Harness, Dickey & Pierce, P.L.C.

(57)        ABSTRACT

This document describes techniques and systems for asymmetrical frequency-division multiplexing (FDM) for radar systems. In some examples, a radar system includes multiple transmitters, multiple receivers, multiple polyphase shifters, and a processor. The transmitters can transmit electromagnetic (EM) signals in an FDM scheme. The receivers can receive EM signals reflected by one or more objects that include multiple channels. The polyphase shifters can introduce at least four potential phase shifts. The processor can control the polyphase shifters to introduce phase shifts asymmetrically spaced in a frequency spectrum. The processor can determine, using residue estimation and subtraction, potential detections of the objects. In this way, the described asymmetrical FDM for radar systems can support many simultaneous MIMO channels, increase the dynamic (Continued)

range of the radar system, resolve Doppler ambiguities, and provide an efficient processing scheme.

20 Claims, 14 Drawing Sheets

(51) Int. Cl.

| | | |
|---|---|---|
| *H04B 7/0413* | (2017.01) | |
| *G01S 13/32* | (2006.01) | |
| *G01S 13/536* | (2006.01) | |
| *G01S 17/931* | (2020.01) | |
| *H04L 27/18* | (2006.01) | |

(58) Field of Classification Search

CPC .......... G01S 7/354; G01S 13/26; G01S 13/32; G01S 13/58; G01S 2013/9321; G01S 2013/0245; G01S 7/356; G01S 13/584; G01S 7/02; G01S 13/66; G01S 13/288; G01S 7/2926; G01S 13/286; G01S 13/582; G01S 7/023; G01S 13/325; G01S 13/345; G01S 13/878; G01S 7/42; H04B 7/0413; H04J 1/02

USPC ............................. 342/59, 70, 104, 196, 189

See application file for complete search history.

(56) References Cited

U.S. PATENT DOCUMENTS

| | | | |
|---|---|---|---|
| 7,474,262 B2 | 1/2009 | Alland | |
| 9,182,476 B2 | 11/2015 | Wintermantel | |
| 10,917,162 B2 * | 2/2021 | Smart | H04B 7/18515 |
| 11,513,187 B2 | 11/2022 | Stettiner et al. | |
| 11,709,247 B2 | 7/2023 | Heller | |
| 12,072,421 B2 * | 8/2024 | Crouch | G01S 13/343 |
| 2009/0110033 A1 * | 4/2009 | Shattil | H04B 1/7174 |
| | | | 375/147 |
| 2017/0160380 A1 | 6/2017 | Searcy et al. | |
| 2018/0097677 A1 * | 4/2018 | Guey | H04L 27/18 |
| 2018/0329054 A1 | 11/2018 | Pokrass et al. | |
| 2019/0049577 A1 * | 2/2019 | Iida | G01S 13/931 |
| 2019/0377059 A1 | 12/2019 | Kondo et al. | |
| 2020/0025914 A1 | 1/2020 | Li et al. | |
| 2020/0049812 A1 | 2/2020 | Jansen | |
| 2020/0081110 A1 * | 3/2020 | Nam | G01S 13/42 |
| 2020/0191940 A1 * | 6/2020 | Wu | G01S 13/931 |
| 2020/0233076 A1 | 7/2020 | Chen et al. | |
| 2021/0333386 A1 | 10/2021 | Park et al. | |
| 2022/0099837 A1 * | 3/2022 | Crouch | G01S 13/931 |
| 2022/0283284 A1 * | 9/2022 | Li | G01S 13/26 |

OTHER PUBLICATIONS

"Extended European Search Report", EP Application No. 22200283. 4, Aug. 18, 2023, 9 pages.

"Extended European Search Report", EP Application No. 22150642. 1, Jun. 27, 2022, 6 pages.

"Extended European Search Report", EP Application No. 22150643. 9, Jun. 27, 2022, 7 pages.

Buratti, et al., "New results on modular Golomb rulers, optical orthogonal codes and related structures", ARS Mathematica Contemporanea, vol. 20, No. 1, 2021, pp. 1-27.

Chinese Office Action and Search Report for Chinese Application No. CN202211550197.7 dated Dec. 25, 2025.

* cited by examiner

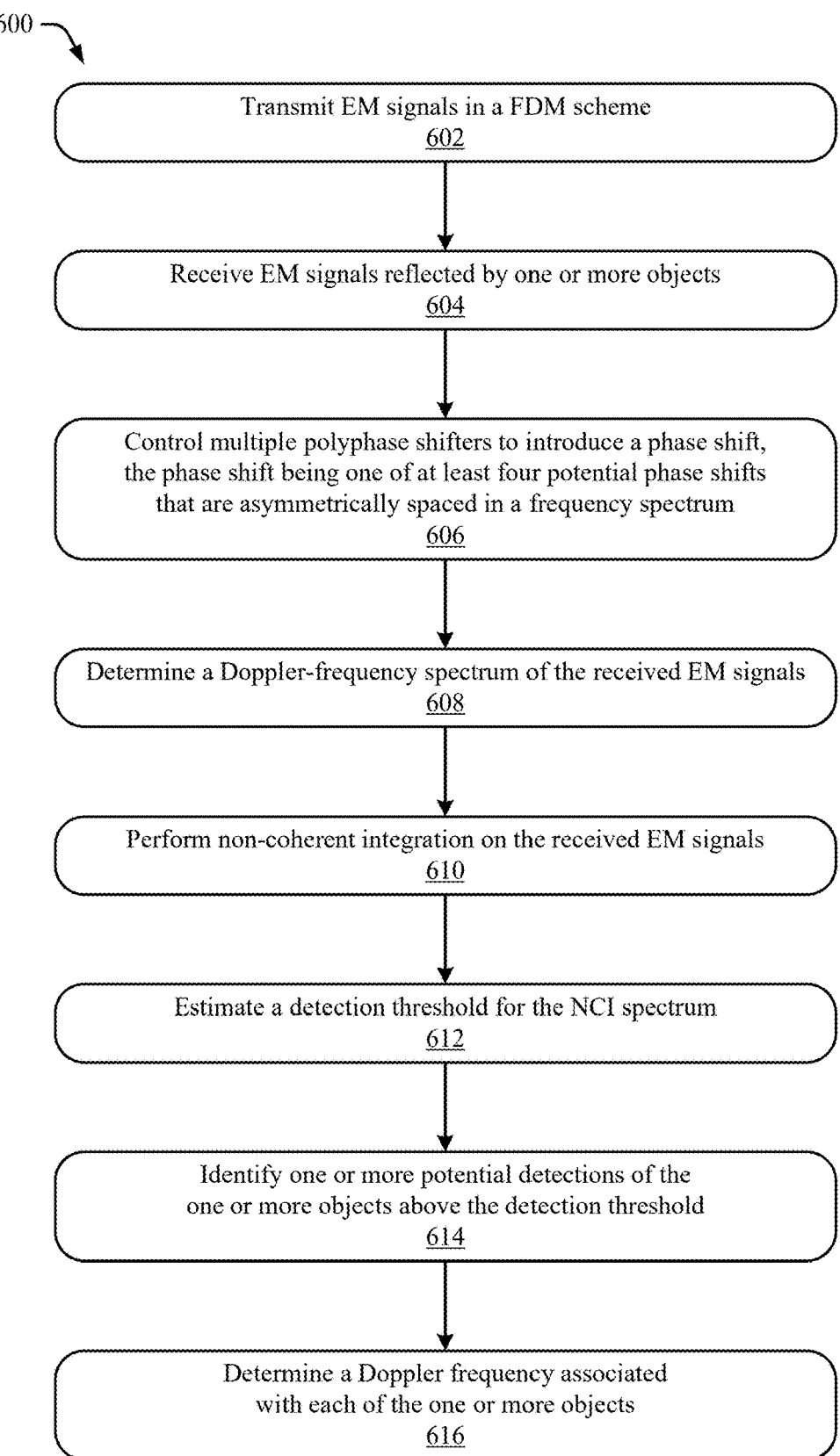

600

Transmit EM signals in a FDM scheme
602

Receive EM signals reflected by one or more objects
604

Control multiple polyphase shifters to introduce a phase shift,
the phase shift being one of at least four potential phase shifts
that are asymmetrically spaced in a frequency spectrum
606

Determine a Doppler-frequency spectrum of the received EM signals
608

Perform non-coherent integration on the received EM signals
610

Estimate a detection threshold for the NCI spectrum
612

Identify one or more potential detections of the
one or more objects above the detection threshold
614

Determine a Doppler frequency associated
with each of the one or more objects
616

ASYMMETRICAL FREQUENCY-DIVISION MULTIPLEXING FOR RADAR SYSTEMS

CROSS-REFERENCE TO RELATED APPLICATIONS

This application claims the benefit of U.S. Provisional Application No. 63/364,223, filed May 5, 2022, and U.S. Provisional Application No. 63/362,030, filed Mar. 28, 2022, the disclosures of which are hereby incorporated by reference in their entireties herein.

BACKGROUND

Radar systems transmit and receive electromagnetic (EM) signals for detecting and tracking objects. In automotive applications, radar systems provide information about the vehicle's environment and can play an essential role in Advanced Driver Assistance Systems (ADAS). Highly automated systems generally require radar data with high resolution in range, Doppler, and angular dimensions. Popular approaches to achieving improved angular dimensions are multiple-input and multiple-output (MIMO) radar techniques that provide relatively large virtual arrays with reduced angular ambiguity that may form larger virtual arrays than the physical aperture. Depending on the waveforms, MIMO techniques, however, can lead to reduced dynamic range and/or inadequate range or Doppler coverage as well as other issues.

SUMMARY

This document describes techniques and systems for asymmetrical frequency-division multiplexing (FDM) for radar systems. In some examples, a radar system for installation on a vehicle includes multiple transmitters, multiple receivers, multiple polyphase shifters, and a processor. The transmitters can transmit electromagnetic (EM) signals in an FDM scheme. The receivers can receive EM signals reflected by one or more objects that include multiple channels. The polyphase shifters can introduce at least four potential phase shifts to the transmitted EM signals or received EM signals. The polyphase shifters are operably connected to the transmitters or receivers. The processor can control the polyphase shifters to introduce phase shifts that are asymmetrically spaced in a frequency spectrum. The processor can determine, using residue estimation and subtraction, potential detections of the objects. In this way, the described asymmetrical FDM for radar systems can support many simultaneous MIMO channels, increase the dynamic range of the radar system, resolve Doppler ambiguities, and provide an efficient processing scheme.

This document also describes methods performed by the above-summarized system and other configurations of the radar system set forth herein and means for performing these methods.

This Summary introduces simplified concepts related to enabling asymmetrical FDM in a radar system, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of asymmetrical FDM for radar systems are described in this document with reference to the following figures. The same numbers are often used throughout the drawings to reference like features and components:

FIG. 1 illustrates an example environment in which a radar system can use asymmetrical FDM in accordance with techniques of this disclosure;

FIGS. 3, 4-1, and 4-2 illustrate example conceptual diagrams of a radar system that uses asymmetrical FDM;

FIG. 6 illustrates an example method for a radar system that uses asymmetrical FDM with polyphase shifters to determine a Doppler frequency of objects; and FIGS. 7-1 through 7-7 illustrate Doppler-frequency spectrums from a radar system that uses asymmetrical FDM to determine detections associated with objects.

DETAILED DESCRIPTION

Overview

Figure 2:
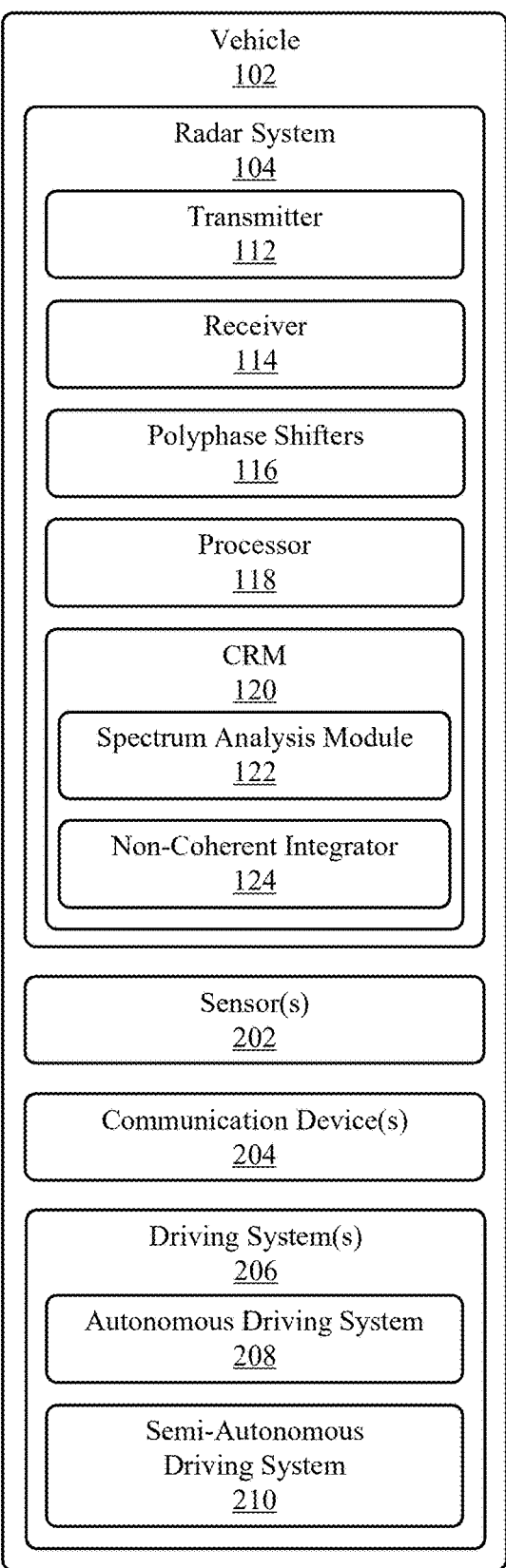
FIG. 2 illustrates an example configuration of a radar system using asymmetrical FDM within a vehicle in accordance with techniques of this disclosure.

Radar systems can be configured as an important sensing technology that vehicle-based systems use to acquire information about the surrounding environment. For example, vehicle-based systems can use radar systems to detect objects in or near a roadway and, if necessary, take necessary actions (e.g., reduce speed, change lanes) to avoid a collision.

Radar systems generally include at least two antennas to transmit and receive radar (e.g., EM) signals. Many vehicle-based systems require high resolution in range, Doppler frequency, and angle. These systems also require accurate discrimination between multiple targets with similar Doppler frequencies. Often these requirements are addressed by including more antenna channels in radar systems. For example, some automotive radar systems operate MIMO radars to increase the number of channels and improve angular resolution. A MIMO radar system with three transmit channels and four receive channels can form a virtual array (also referred to as a "synthetic array") of twelve channels. With additional channels, a MIMO radar system can operate with an improved angular resolution, relying on a flexible physical layout of inexpensive and possibly fewer hardware components than traditional non-MIMO radar systems.

MIMO radar systems generally use orthogonal waveforms to transmit and receive independent, orthogonal EM signals and identify or separate the different channels. Radar systems can implement orthogonal waveforms in various ways, including using time-division multiplexing (TDM), FDM, and code-division multiplexing (CDM) techniques. However, each orthogonal waveform technique has associated benefits and weaknesses.

For example, FDM techniques generally place signals from transmit channels in different frequency bands by adding frequency offsets to the transmit signals. Such techniques generally operate in a fast-time (range) domain, introduce a range-dependent phase offset among channels, and reduce range coverage. FDM techniques can also require a higher sampling rate due to the increased intermediate-frequency bandwidth.

CDM techniques can enable simultaneous transmission and operate in fast-time (e.g., within a chirp, range domain) and slow-time domains (e.g., chirp to chirp, Doppler domain). CDM techniques generally recover a signal matching a current code by suppressing energy from other coded signals. The distributed EM energy left from the suppressed signals is generally considered residue or noise and limits the dynamic range of the radar system. A smaller dynamic range limits the radar system's ability to differentiate smaller objects from larger objects.

Some TDM techniques do not support simultaneous transmission. Instead, individual transmitters transmit sequentially, leading to less interference between transmit channels and a maximum degree of orthogonality. Such techniques, however, generally do not provide the signal-to-noise ratio benefits realized with simultaneous transmission techniques (e.g., FDM and CDM techniques) and can lead to Doppler ambiguity among channels.

Previously used techniques, including those described above, generally do not provide adequate discrimination among channels (e.g., Doppler ambiguity, target mixing) and can have reduced Doppler coverage, gain, and dynamic range. In addition, these techniques generally require computationally-expensive processing to support a large number of MIMO channels.

In contrast, this document describes techniques and systems to provide a radar system that achieves simultaneous transmission using FDM and coding techniques to provide many MIMO channels. This document also describes an efficient processing technique to provide an improved dynamic range. In this way, the described techniques and systems support multiple transmitters transmitting simultaneously with accurate recovery and increased dynamic range as more MIMO channels are used.

For example, a vehicle's radar system includes multiple transmitters, multiple receivers, multiple polyphase shifters, and a processor. The transmitters can transmit EM signals in an FDM scheme. The receivers can receive EM signals reflected by one or more objects that include multiple channels. The polyphase shifters can introduce multiple potential phase shifts to the transmitted EM signals or received EM signals. The processor can control the polyphase shifters to introduce asymmetrical phase shifts. The processor can determine, using non-coherent integration and residue extraction on the received EM signals, potential detections of the objects. In this way, multiple transmitters transmitting simultaneously with accurate recovery and increased dynamic range are supported.

This example is just one example of the described techniques and systems of a radar system using asymmetrical FDM. This document describes other examples and implementations.

Operating Environment

Figures 1, 4:
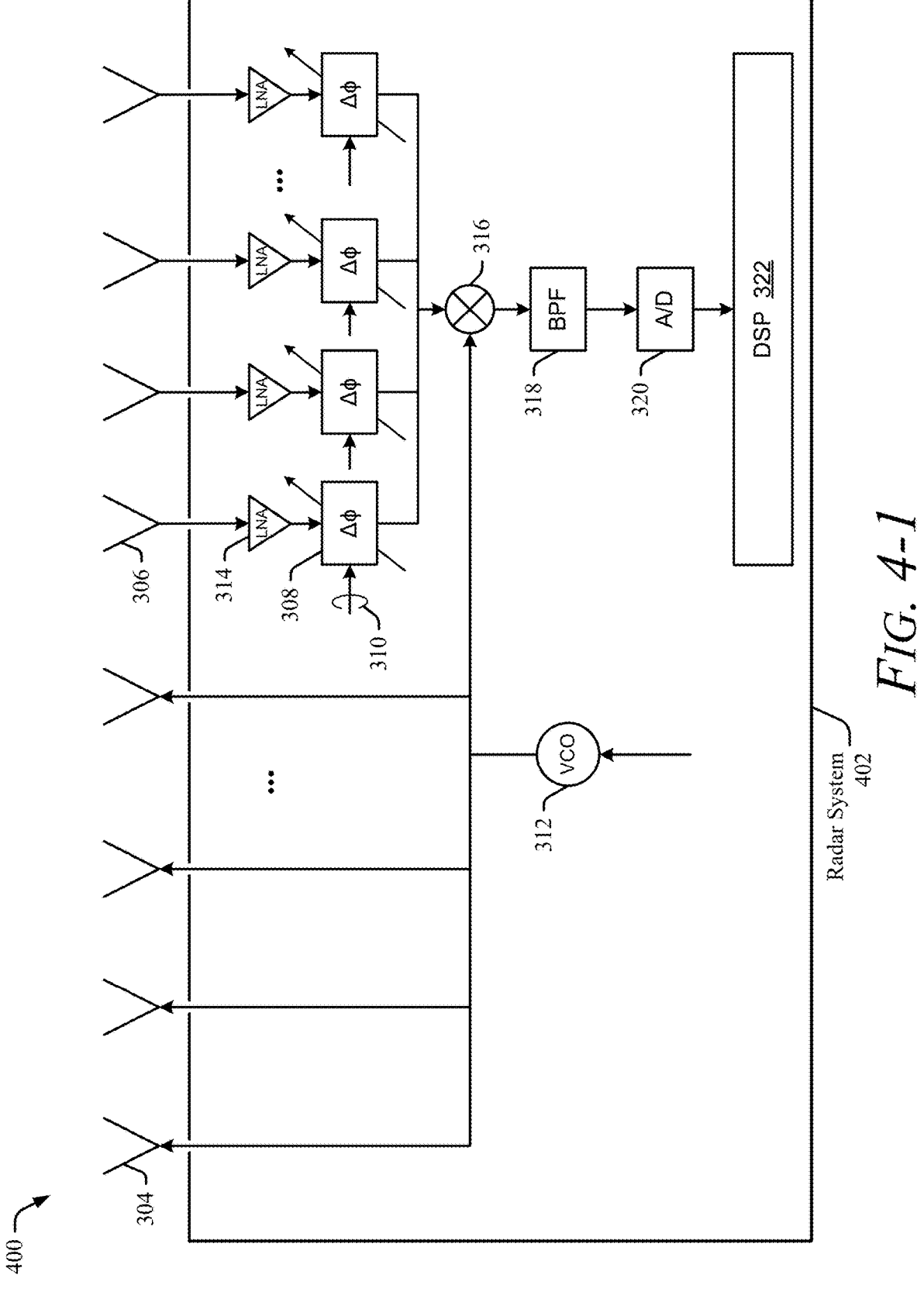
Figures 2, 4:
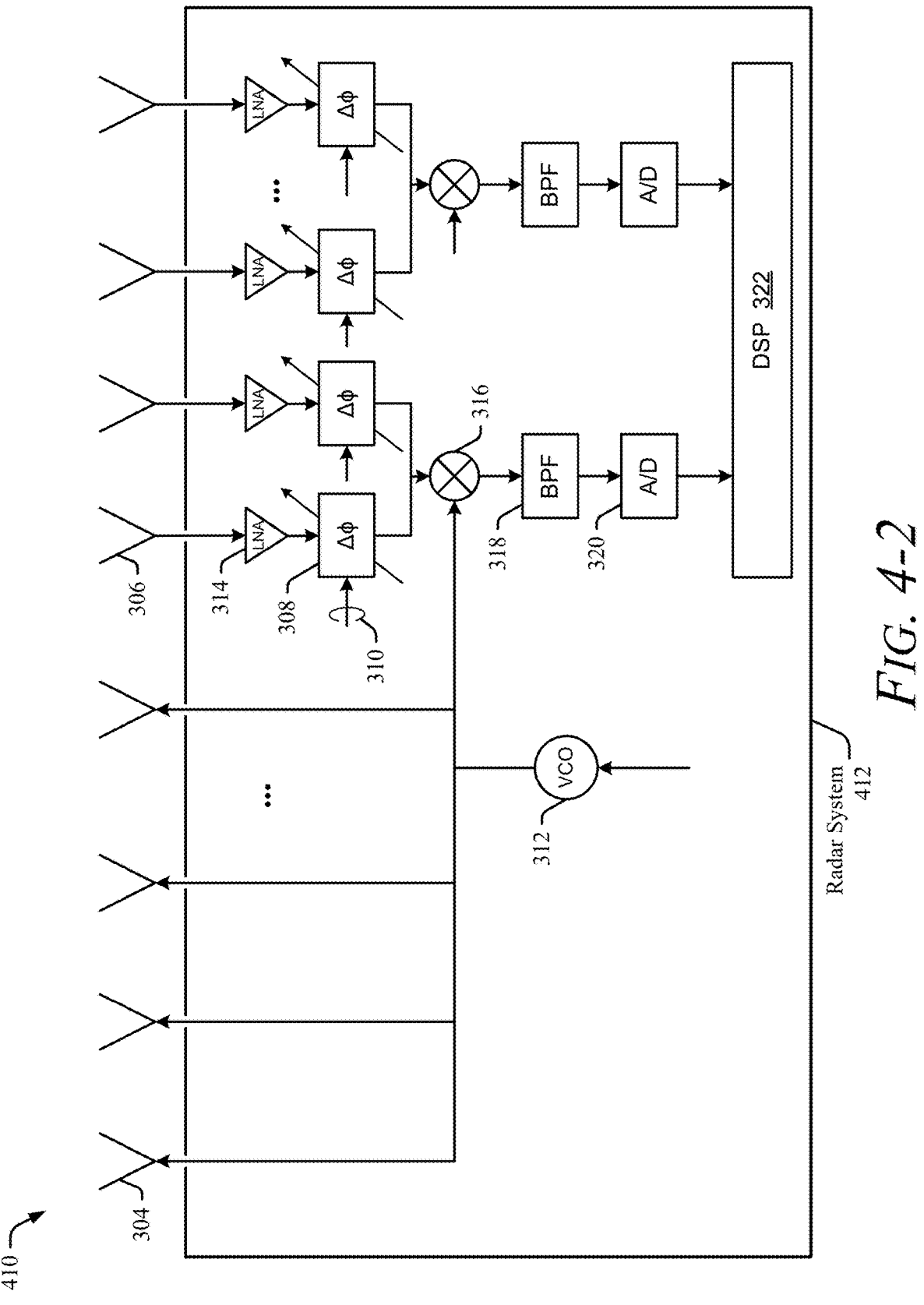

FIG. 1 illustrates an example environment 100 in which a radar system 104 can use asymmetrical FDM in accordance with the techniques of this disclosure. In the depicted environment 100, the radar system 104 is mounted to, or integrated within, a vehicle 102 traveling on a roadway 106. Within a field-of-view 108, the radar system 104 can detect one or more objects 110 in the vicinity of the vehicle 102.

The radar system 104 can detect one or more objects 110 in the vicinity of the vehicle 102. Although illustrated as a sedan, the vehicle 102 can represent other types of motorized vehicles (e.g., a car, an automobile, a truck, a motorcycle, a bus, a tractor, a semi-trailer truck), non-motorized vehicles (e.g., a bicycle), railed vehicles (e.g., a train), watercraft (e.g., a boat), and aircraft (e.g., an airplane). In general, manufacturers can mount the radar system 104 to any moving platform, including moving machinery or robotic equipment.

In the depicted implementation, the radar system 104 is mounted on the front of the vehicle 102 and illuminates the object 110. The radar system 104 can detect the object 110 from any exterior surface of the vehicle 102. For example, vehicle manufacturers can integrate the radar system 104 into a bumper, side mirror, headlights, rear lights, or any other interior or exterior location where the object 110 requires detection. In some cases, the vehicle 102 includes multiple radar systems 104, such as a first radar system 104 and a second radar system 104, that provide a larger instrument field-of-view 108. In general, vehicle manufacturers can design the locations of the radar systems 104 to provide a particular field-of-view 108 that encompasses a region of interest. Example fields-of-view 108 include a 360-degree field-of-view, one or more 180-degree fields-of-view, one or more 90-degree fields-of-view, and so forth, which can overlap or be combined into a field-of-view 108 of a particular size.

The object 110 is composed of one or more materials that reflect radar or EM signals. Depending on the application, the object 110 can represent a target of interest. In some cases, the object 110 can be a moving object (e.g., another vehicle) or a stationary object (e.g., a roadside sign, road barrier, debris). Depending on the application, the object 110 can represent a target of interest from which the vehicle 102 can safely navigate the roadway 106.

The radar system 104 emits EM radiation by transmitting EM signals or waveforms via antenna elements. For example, in the environment 100, the radar system 104 can detect and track the object 110 by transmitting and receiving one or more EM signals. For example, the radar system 104 can transmit EM signals between one hundred and four hundred gigahertz (GHz), between four and one hundred GHz, or between approximately seventy and eighty GHz.

The radar system 104 can be a MIMO radar system that can match the reflected EM signals to corresponding objects 110. The radar system 104 can include a transmitter 112 to transmit EM signals. The radar system 104 can also include a receiver 114 to receive reflected versions of the EM signals. The transmitter 112 includes one or more components, including an antenna or antenna elements, for emitting the EM signals. The receiver 114 includes one or more components, including an antenna or antenna elements, for detecting the reflected EM signals. The transmitter 112 and the receiver 114 can be incorporated together on the same integrated circuit (e.g., a transceiver integrated circuit) or separately on different integrated circuits. In other implementations, the radar system 104 does not include a separate antenna, but the transmitter 112 and the receiver 114 each include one or more antenna elements.

The radar system 104 can also include polyphase shifters 116. The polyphase shifters 116 are respectively associated with and operably connected to the transmitter 112 or the receiver 114. The polyphase shifters 116 can apply a phase shift to one or more signal pulses of the EM signal transmitted by the transmitter 112 in some applications. In other implementations, the polyphase shifters 116 can apply a phase shift to one or more signal pulses of the reflected EM signal received by the receiver 114.

The radar system 104 also includes one or more processors 118 (e.g., an energy processing unit) and computer-readable storage media (CRM) 120. The processor 118 can be a microprocessor or a system-on-chip. The processor 118 can execute instructions stored in the CRM 120. For example, the processor 118 can process EM energy received by the receiver 114 and determine, using a spectrum analysis module 122 and non-coherent integrator 124, the location of the object 110 relative to the radar system 104. The processor 118 can also detect various features (e.g., range, target angle, range rate, velocity) of the object 110. The processor 118 can include instructions or be configured to control the transmitter 112, the receiver 114, or the polyphase shifters 116. The processor 118 can also generate radar data for at least one automotive system. For example, the processor 118 can control, based on processed EM energy from the receiver 114, an autonomous or semi-autonomous driving system of the vehicle 102.

The spectrum analysis module 122 allows for multiple channels in the received EM signals to resolve Doppler ambiguities among the received EM signals. In particular, the spectrum analysis module 122 can estimate and remove residue from targets detected in a Doppler-frequency spectrum of the received EM signals. In this way, the spectrum analysis module 122 can suppress residue close to a noise floor and improve the detection dynamic range of the radar system 104. This document describes the operation and functionality of the spectrum analysis module 122 in greater detail with respect to FIGS. 6 through 7-7. The radar system 104 can implement the spectrum analysis module 122 as instructions in the CRM 120, hardware, software, or a combination thereof executed by the processor 118.

The non-coherent integrator 124 can process EM energy received by the receiver 114 to identify the objects 110 (e.g., from detected targets) and resolve Doppler ambiguities regarding the objects 110 within the field-of-view 108 of the radar system 104. The non-coherent integrator 124 can use circular shifting and summation schemes to reject aliased detections and resolve Doppler ambiguities, as described in greater detail with respect to FIGS. 6 through 7-7. The radar system 104 can implement the non-coherent integrator 124 as instructions in the CRM 120, hardware, software, or a combination thereof executed by the processor 118.

The described radar system 104 can facilitate the simultaneous transmission of multiple transmitter channels for a MIMO radar system with polyphase shifters 116. The described aspects of asymmetrical FDM support multiple transmitters 112 transmitting simultaneously with accurate recovery and without Doppler ambiguity. Accurate recovery is possible because interference among channels is prevented (e.g., avoided) and Doppler ambiguity is resolved to reject aliased detections.

As an example environment, FIG. 1 illustrates the vehicle 102 traveling on the roadway 106. The radar system 104 detects the object 110 in front of the vehicle 102. The radar system 104 can define a coordinate system with an x-axis (e.g., in a forward direction along the roadway 106), and a y-axis (e.g., perpendicular to the x-axis and along a surface of the roadway 106), in some cases, further defining a z-axis (e.g., normal to the x-y plane defined by the x and y-axis). The transmitter 112 of the radar system 104 can transmit EM signals in front of the vehicle 102. The object 110 can reflect the transmitted EM signals as reflected EM signals. The receiver 114 can detect the reflected EM signals.

The vehicle 102 can also include at least one automotive system that relies on data from the radar system 104, such as a driver-assistance system, an autonomous-driving system, or a semi-autonomous-driving system. The radar system 104 can include an interface to an automotive system that relies on the data. For example, via the interface, the processor 118 outputs a signal based on EM energy received by the receiver 114.

Generally, the automotive systems use radar data provided by the radar system 104 to perform a function. For example, the driver-assistance system can provide blindspot monitoring and generate an alert that indicates a potential collision with the object 110 that is detected by the radar system 104. The radar data from the radar system 104 indicates when it is safe or unsafe to change lanes in such an implementation. The autonomous-driving system may move the vehicle 102 to a particular location on the roadway 106 while avoiding collisions with the object 110 detected by the radar system 104. The radar data provided by the radar system 104 can provide information about the distance to and the location of the object 110 to enable the autonomous-driving system to perform emergency braking, perform a lane change, or adjust the speed of the vehicle 102.

The radar system 104 operates using efficient processing techniques to provide an improved dynamic range. This way, the radar system 104 can support multiple transmitters transmitting simultaneously with accurate recovery and increased dynamic range as more MIMO channels are used.

FIG. 2 illustrates an example configuration of a radar system using asymmetrical FDM within the vehicle 102 in accordance with techniques of this disclosure. The vehicle 102 can include driving systems 206, including an autonomous driving system 208 or semi-autonomous driving system 210, that use radar data from the radar system 104 to control the vehicle 102. As described with respect to FIG. 1, the vehicle 102 can include the radar system 104.

The vehicle can also include one or more sensors 202, one or more communication devices 204, and the driving systems 206. The sensors 202 can include a location sensor, a camera, a lidar system, or a combination thereof. The location sensor, for example, can include a positioning system that can determine the position of the vehicle 102. The camera system can be mounted on or near the front of the vehicle 102. The camera system can take photographic images or video of the roadway 106. In other implementations, a portion of the camera system can be mounted into a rear-view mirror of the vehicle 102 to have a field-of-view of the roadway 106. In yet other implementations, the camera system can project the field-of-view from any exterior surface of the vehicle 102. For example, vehicle manufacturers can integrate at least a part of the camera system into a side mirror, bumper, roof, or any other interior or exterior location where the field-of-view includes the roadway 106. The lidar system can use electromagnetic signals to detect the objects 110 (e.g., other vehicles) on the roadway 106. Data from the lidar system can provide an input to the spectrum analysis module 122 or the non-coherent integrator 124. For example, the lidar system can determine the traveling speed of a vehicle in front of the vehicle 102 or nearby vehicles traveling in the same direction as the vehicle 102.

The communication devices 204 can be radio frequency (RF) transceivers to transmit and receive RF signals. The transceivers can include one or more transmitters and receivers incorporated together on the same integrated circuit (e.g., a transceiver integrated circuit) or separately on different integrated circuits. The communication devices 204 can be used to communicate with remote computing devices (e.g., a server or computing system providing navigation information or regional speed limit information), nearby structures (e.g., construction zone traffic signs, traffic lights, school zone traffic signs), or nearby vehicles. For example, the vehicle 102 can use the communication devices 204 to wirelessly exchange information with nearby vehicles using vehicle-to-vehicle (V2V) communication. The vehicle 102 can use V2V communication to obtain the speed, location, and heading of nearby vehicles. Similarly, the vehicle 102 can use the communication devices 204 to wirelessly receive information from nearby traffic signs or structures to indicate a temporary speed limit, traffic congestion, or other traffic-related information.

The communication devices 204 can include a sensor interface and a driving system interface. The sensor interface and the driving system interface can transmit data over a communication bus of the vehicle 102, for example, between the radar system 104 and the driving systems 206.

The vehicle 102 also includes at least one driving system 206, such as the autonomous driving system 208 or the semi-autonomous driving system 210, that relies on data from the radar system 104 to control the operation of the vehicle 102 (e.g., set the driving speed or avoid the object 110). Generally, the driving systems 206 use data provided by the radar system 104 and/or the sensors 202 to control the vehicle 102 and perform certain functions. For example, the semi-autonomous driving system 210 can provide adaptive cruise control and dynamically adjust the travel speed of the vehicle 102 based on the presence of the object 110 in front of the vehicle 102. In this example, the data from the radar system 104 can identify the object 110 and its speed in relation to the vehicle 102.

The autonomous driving system 208 can navigate the vehicle 102 to a particular destination while avoiding the object 110 as identified by the radar system 104. The data provided by the radar system 104 about the object 110 can provide information about the location and/or speed of the object 110 to enable the autonomous driving system 208 to adjust the speed of the vehicle 102.

Example Configurations

Figure 3:
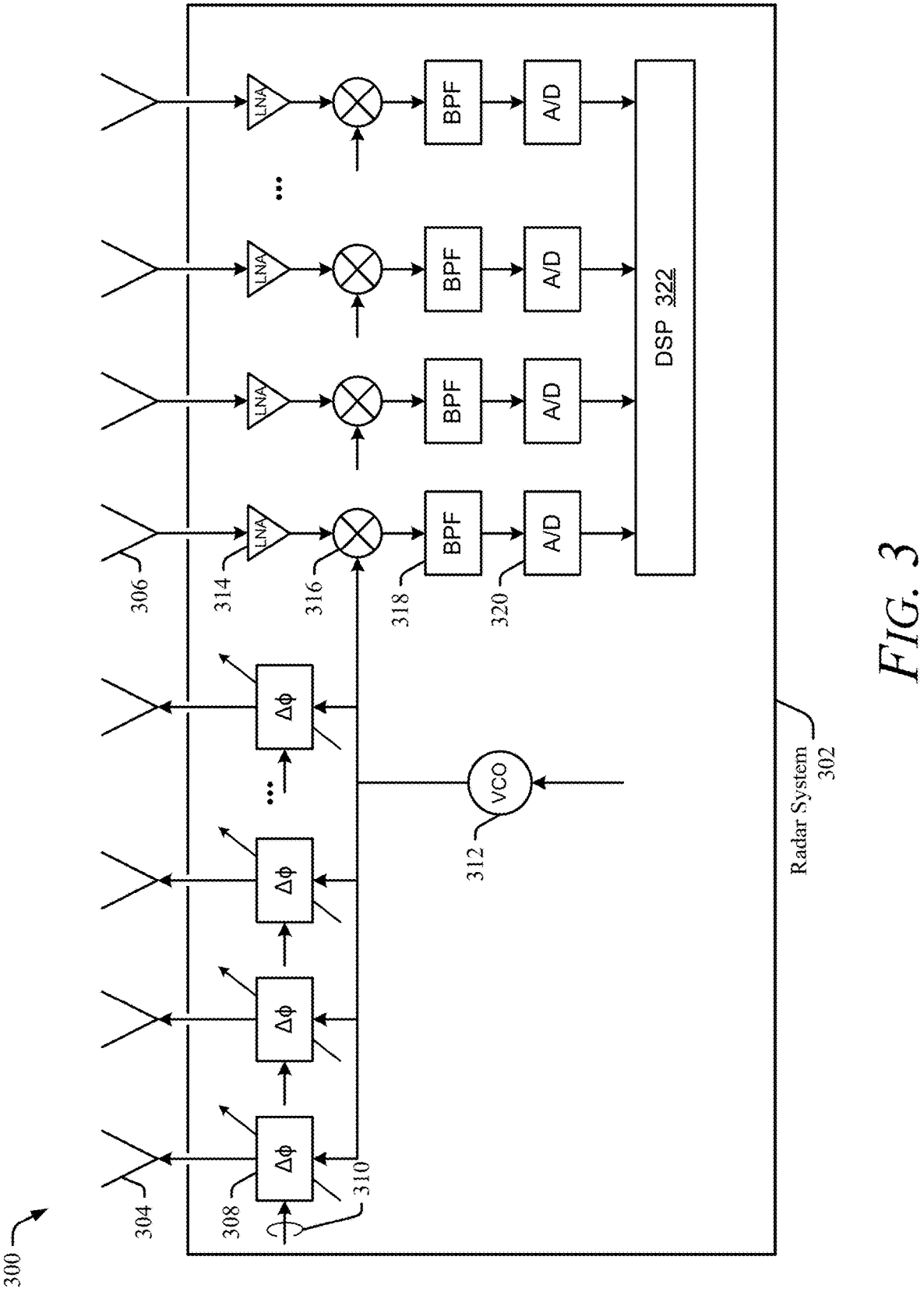

FIG. 3 illustrates an example conceptual diagram 300 of a radar system 302 that uses asymmetrical FDM. For example, the radar system 302 can be the radar system 104 of FIGS. 1 and 2. The conceptual diagram 300 illustrates components of the radar system 302 as distinct components, but some or all of them may be combined into a smaller subset of distinct components.

In the depicted implementation, the radar system 302 includes multiple transmitters 304, which are illustrated as antenna elements in this example, configured to transmit respective EM signals. The radar system 302 uses the transmitted EM signals to detect any objects 110 in the vicinity of the vehicle 102, and which are within the field-of-view 108. The transmitters 304 can transmit a linear frequency-modulated signal (e.g., chirping signal) in some implementations. In other implementations, the transmitters 304 can transmit a phase-modulated continuous wave (PMCW) signal or a pulse signal (e.g., unmodulated signal). The transmitted EM signals can be any viable signal used for a radar system. The radar system 302 also includes multiple receivers 306, which are illustrated as antenna elements in this example, configured to receive reflected EM signals reflecting by the objects 110.

The radar system 302 includes a processor and CRM, which can be the processor 118 and the CRM 120 of FIGS. 1 and 2, respectively. The CRM includes instructions that, when executed by the processor, causes the processor to control the transmitters 304 or phase shifters 308. For example, the processor can use the spectrum analysis module 122 to control the phase shift applied or introduced to the transmitted EM signals.

In the illustrated example, the radar system 302 includes a voltage-controlled oscillator (VCO) 312 operatively coupled to the transmitters 304. The VCO 312 provides the basis or reference signal for EM signals transmitted by the transmitters 304. The multiple polyphase shifters 308 are respectively associated with the transmitters 304 and coupled to the transmitters 304 and the VCO 312. In the depicted implementation, a phase shifter 308 is operatively coupled to each transmitter 304. In other implementations, a phase shifter 308 can be operatively coupled to fewer than each transmitter 304.

The polyphase shifters 308 can control a phase shift applied or introduced to one or more EM signal pulses transmitted by the transmitters 304. Each polyphase shifter 308 has multiple potential output stages (e.g., 4, 8, 16, 32, 64, 128, or 256 stages). For example, the processor can provide a polyphase control signal 310 to the polyphase shifters 308 to control or set the phase stage of each polyphase shifter 308. The polyphase control signal 310 can be a multiple-bit signal (e.g., 6-bit, 8-bit, 12-bit, 16-bit, 24-bit, or 32-bit), allowing the polyphase shifters 308 to have more than two phase stages. For example, a six-bit polyphase shifter 308 has up to 64 potential phase stages. The increased number of potential phase stages provides more flexibility in an FDM coding scheme applied by the radar system 302 than binary phase shifters can provide. The polyphase control signal 310 can add a progressive phase modulation $\phi$ to the transmitted EM signal pulses, which asymmetrically shifts the frequency or Doppler frequency of the reflected EM signals by an offset frequency $\omega_c$, which is equal to the product of two, pi, and the phase modulation (e.g., $\omega_c=2\pi\phi$).

As described above, the receivers 306 receive reflected EM signals. The radar system 302 processes the received EM signals to make one or more determinations regarding objects 110 within the field-of-view 108 of the radar system 302. The receivers 306 are operatively coupled to respective low noise amplifiers (LNAs) 314. The LNAs 314 can amplify the received EM signal without significant degradation to the signal-to-noise ratio. The LNAs 314 are operatively coupled to respective mixers 316, which are coupled to the VCO 312. The output of the VCO 312 serves as a reference signal and combines with the respective received EM signals in the mixers 316. The radar system 302 passes the respective received EM signals through band-pass filters (BPFs) 318 and analog-to-digital converters (ADCs) 320 before analyzing them with a digital signal processor (DSP) 322. The DSP 322 can make one or more determinations regarding the objects 110, including resolving Doppler ambiguities. The BPFs 318 can pass frequencies in the received EM signals within a specific range and reject or attenuate frequencies outside this range. In other implementations, the radar system 302 can use additional or different filters, including low-pass filters or high-pass filters. The ADCs 320 converts the analog EM signals into a digital signal. The DSP 322 can use the non-coherent integrator 124 to resolve Doppler ambiguities and identify the Doppler frequency associated with the objects 110. Although the DSP 322 is illustrated as a separate component from the processor, the radar system 302 can include a single processor that controls the transmission of EM signals and makes determinations from the reception of EM signals.

FIGS. 4-1 and 4-2 illustrate other example conceptual diagrams 400 and 410 of a radar system 402 and 412, respectively, that uses asymmetrical FDM. For example, the radar system 402 and 412 can be the radar system 104 of FIGS. 1 and 2. The conceptual diagrams 400 and 410 illustrate components of the radar system 402 and 412, respectively, as distinct components, but some or all of them may be combined into a smaller subset of distinct components.

The radar systems 402 and 412 include similar components as depicted for the radar system 302 in FIG. 3. For example, the radar systems 402 and 412 include the transmitters 304, receivers 306, a processor, CRM, polyphase shifters 308, VCO 312, LNAs 314, the mixer 316, the BPF 318, the ADC 320, and the DSP 322. The polyphase shifters 308 are operatively coupled to the LNAs 314 and the mixer 316 in the receiver paths of the radar systems 402 and 412 to asymmetrically shift the frequency or Doppler frequency of the reflected EM signals. In FIG. 4-1, the polyphase shifters 308 are operatively coupled to each receive channel and then operatively coupled to a single down-conversion or analog-to-digital conversion channel. In FIG. 4-2, the polyphase shifters 308 are operatively coupled to each receive channel and a subset of the receive channels or polyphase shifters 308 are then operatively coupled to a down-conversion or analog-to-digital conversion channel. As illustrated in the conceptual diagram 410, the radar system 412 includes two polyphase shifters 308 or receive channels per down-conversion or analog-to-digital conversion channel. In other implementations, the radar system 412 can include another number of polyphase shifters 308 or receive channels per down-conversion or analog-to-digital conversion channel, resulting in N receive groups with M receive channels per receive group.

The polyphase shifters 308 can also be operatively coupled in between other components in the receiver paths, including between the receivers 306 and the LNAs 314. The polyphase shifters 308 are not operatively coupled to the transmitters 304 but instead respectively associated with the receivers 306. The polyphase shifters 308 can introduce or apply an asymmetrical phase shift to the received EM signals. The radar system 402 or 412 can combine (e.g., superimpose) the signals received by one or more of the receivers 306 prior to analog-to-digital conversion by the ADC 320.

As described above, each polyphase shifter 308 has multiple potential output stages (e.g., 4, 8, 16, 32, 64, 128, or 256 stages). For example, the processor 118 can provide the polyphase control signal 310 to the polyphase shifters 308 to control or set the phase stage of each polyphase shifter 308. The polyphase control signal 310 can be a multiple-bit signal (e.g., 6-bit, 8-bit, 12-bit, 16-bit, 24-bit, or 32-bit), giving the polyphase shifters 308 more than two phase stages. The increased number of potential phase stages provides more flexibility in an FDM coding scheme applied by the radar system 402 to the received EM signals than binary phase shifters can provide. The polyphase control signal 310 can add a progressive phase modulation $\emptyset$ to the received EM signal pulses, which asymmetrically shifts the frequency or Doppler frequency of the reflected EM signals by an offset frequency $\omega_c$, which is equal to the product of two, pi, and the phase modulation (e.g., $\omega_c = 2\pi\phi$).

Figure 5:
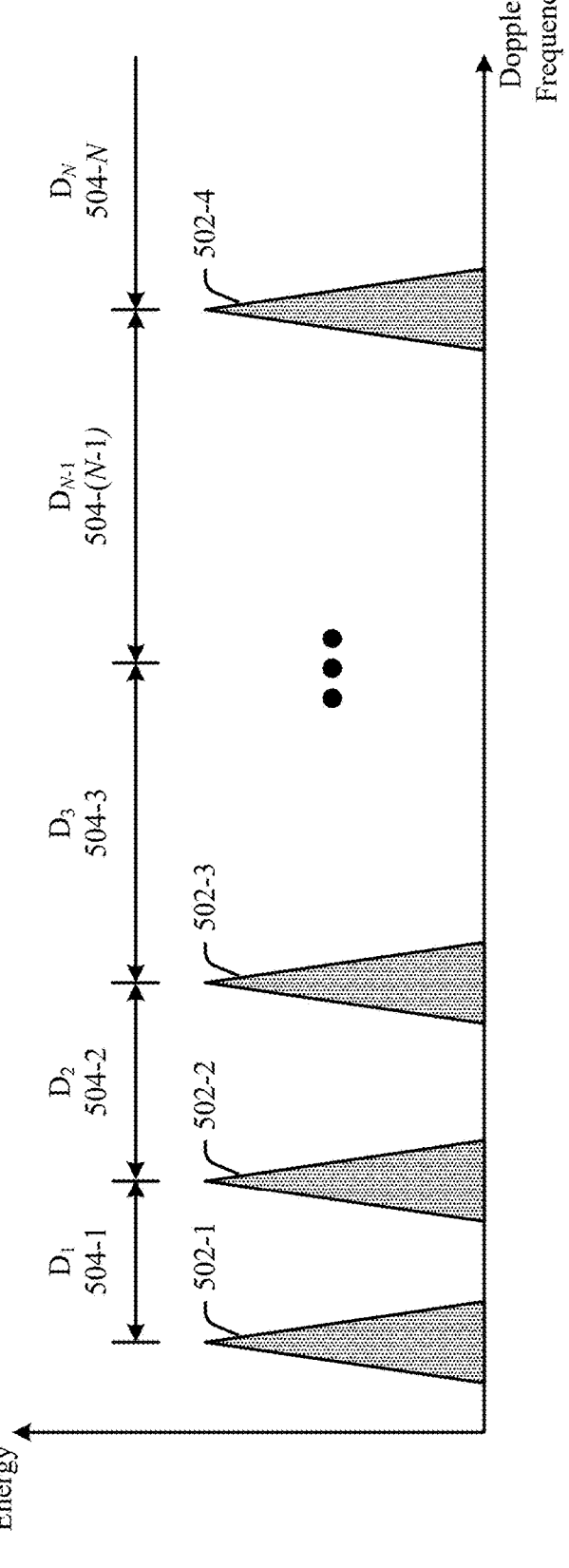
FIG. 5 illustrates an example graphical representation of a waveform in a radar system using asymmetrical FDM.

FIG. 5 illustrates an example graphical representation 500 of a waveform in a radar system using asymmetrical FDM. For example, the radar system can be the radar system 104 of FIGS. 1 and 2, the radar system 302 of FIG. 3, the radar system 402 of FIG. 4-1, or the radar system 412 of FIG. 4-2.

The graphical representation 500 illustrates energy of received EM signals as a y-axis and a corresponding Doppler frequency of the received EM signals as an x-axis. The received EM signals include N channels 502, which are represented in FIG. 5 by the triangular peaks corresponding to an actual detection or aliased detection within each channel.

The radar system 104 applies asymmetrical Doppler spectrum spacing to the transmitted or received EM signals to provide a full asymmetrical waveform. Each channel 502 is separated in the Doppler spectrum by a Doppler frequency 504, $D_i$, (e.g., Doppler frequency 504-1, 504-2, 504-3, 504-(N−1), 504-N. For example, first channel 502-1 and the second channel 502-2 are separated by the Doppler frequency 504-1, $D_1$. The asymmetrical Doppler spectrum results in each Doppler frequency 504 being a unique value (e.g., $D_1 \neq D_2 \neq D_3 \neq D_{N-1} \neq D_N$). If a peak from two different objects are mixed in the Doppler spectrum, only one channel 502 from each object is mixed, resulting in a signal-to-interference ratio of approximately N or an interference-to-signal ratio of 1/N.

The asymmetrical Doppler spectrum provides nonoverlapping codes when circular shifting is applied to the channels. The channel placement can be chosen using modular Golomb rulers or random searching. For example, the received EM signals can include four channels, where the four channels are located in the frequency spectrum at a product of two times pi divided by 16 ($2\pi/16$) and 0, 2, 5, and 6, respectively, or circular shift equivalents thereof. As another example, the received EM signals can include six channels, where the six channels are located in the frequency spectrum at a product of two times pi divided by 64 ($2\pi/64$) and 0, 16, 20, 33, 38, and 39, respectively, or circular shift equivalents thereof. In another example, the received EM signals can include eight channels, where the eight channels are located in the frequency spectrum at a product of two times pi divided by 64 ($2\pi/64$) and 0, 4, 5, 17, 19, 25, 28, and 35, respectively, or circular shift equivalents thereof. In yet another example, the received EM signals can include twelve channels, where the twelve channels are located in the frequency spectrum at a product of two times pi divided by 256 ($2\pi/256$) and 0, 17, 44, 67, 158, 161, 163, 167, 174, 199, 219, and 238, respectively, or circular shift equivalents thereof. In yet another example, the received EM signals can include sixteen channels, where the sixteen channels are located in the frequency spectrum at a product of two times pi divided by 512 ($2\pi/512$) and 0, 1, 16, 30, 37, 40, 81, 92, 115, 123, 135, 219, 223, 236, 241, and 268, respectively, or circular shift equivalents thereof. In yet another example, the received EM signals can include 24 channels, where the 24 channels are located in the frequency spectrum at a product of two times pi divided by 1024 ($2\pi/1024$) and 0, 9, 33, 37, 38, 97, 122, 129, 140, 142, 152, 191, 205, 208, 252, 278, 286, 326, 332, 353, 368, 384, 403, and 425, respectively, or circular shift equivalents thereof. In yet another example, the received EM signals can include 32 channels, where the 32 channels are located in the frequency spectrum at a product of two times pi divided by 2048 ($2\pi/2048$) and 0, 7, 15, 26, 28, 57, 112, 118, 136, 176, 177, 181, 211, 214, 258, 309, 318, 341, 389, 403, 456, 476, 512, 528, 582, 628, 671, 696, 745, 762, 772, and 784, respectively, or circular shift equivalents thereof.

Because the polyphase shifters 308 generally realizes polyphase codes via a bit shifter, the number of polyphase codes, v, is typically a power of two (e.g., $v=2^n$, where n represents the number of polyphase bits for the polyphase shifters 308). The number, k, of channels in the radar system is generally much smaller than number of polyphase codes (e.g., $k \ll v$). Each channel is assigned a unique polyphase code from the set of polyphase codes. Using integral phases, x, of the polyphase codes, the Doppler spectrum radian phases, p, can be represented by $p=2\pi/vx$. The integral phases of example polyphase codes is provided in Table 1 below. The ruler or polyphase codes in Table 1 provide the relative separation of channels with additional combinations of polyphase codes possible via circular shifting. For example, the polyphase code placement for four channels can be at [0, 2, 5, 6] or [2, 4, 6, 7] by circular shifting by two.

TABLE 1

| k channels | n polyphase bits | v | Ruler/polyphase codes |
|---|---|---|---|
| 4 | 4 | 16 | [0, 2, 5, 6] |
| 6 | 6 | 64 | [0, 16, 20, 33, 38, 39] |
| 8 | 6 | 64 | [0, 4, 5, 17, 19, 25, 28, 35] |
| 12 | 8 | 256 | [0, 17, 44, 67, 158, 161, 163, 167, 174, 199, 219, 238] |
| 16 | 9 | 512 | [0, 1, 16, 30, 37, 40, 81, 92, 115, 123, 135, 219, 223, 236, 241, 268] |
| 24 | 10 | 1024 | [0, 9, 33, 37, 38, 97, 122, 129, 140, 142, 152, 191, 205, 208, 252, 278, 286, 326, 332, 353, 368, 384, 403, 425] |
| 32 | 11 | 2048 | [0, 7, 15, 26, 28, 57, 112, 118, 136, 176, 177, 181, 211, 214, 258, 309, 318, 341, 389, 403, 455, 476, 512, 528, 582, 628, 671, 696, 745, 762, 772, 784] |

Example Methods

Figures 1, 7:
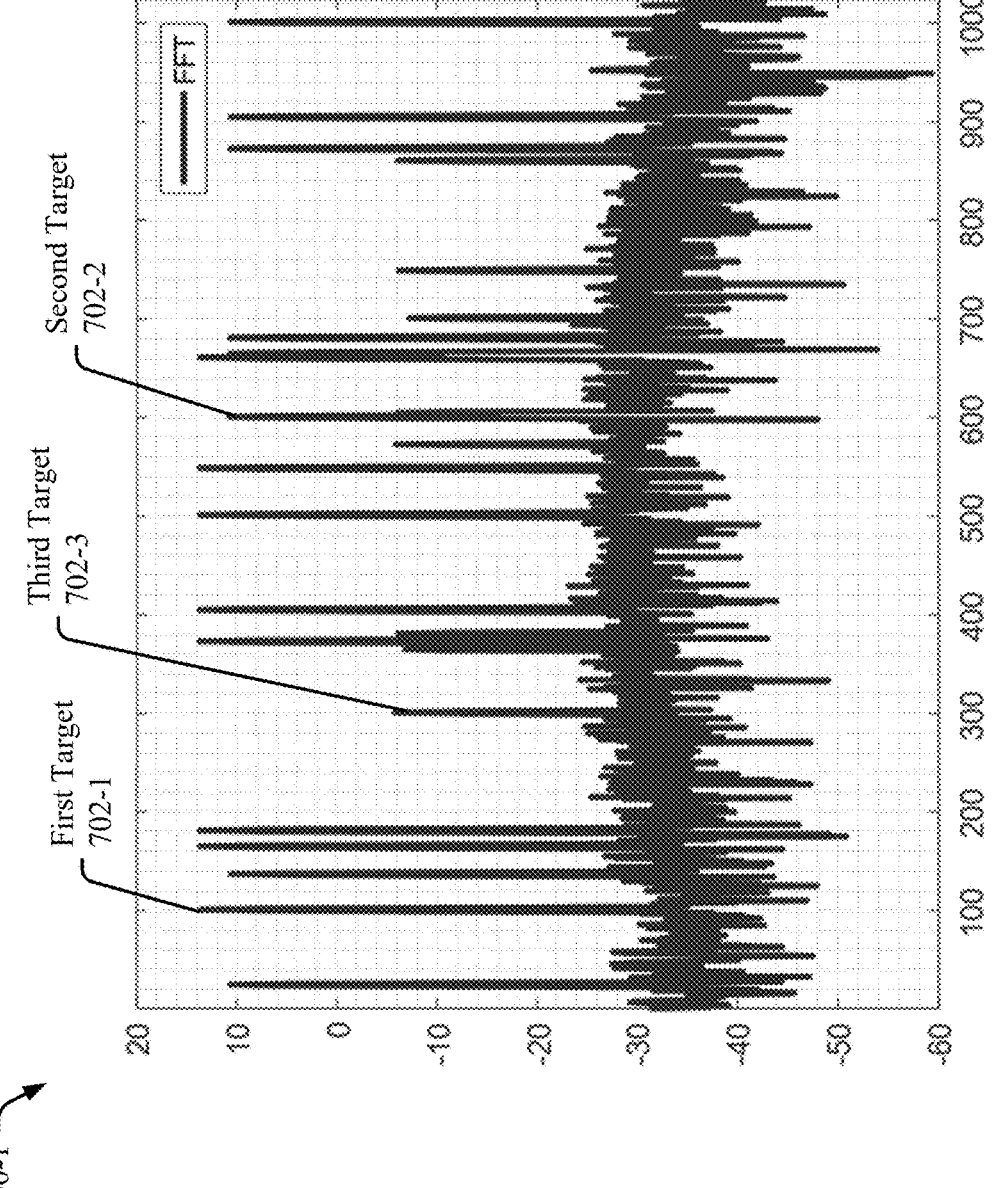
Figure 7:
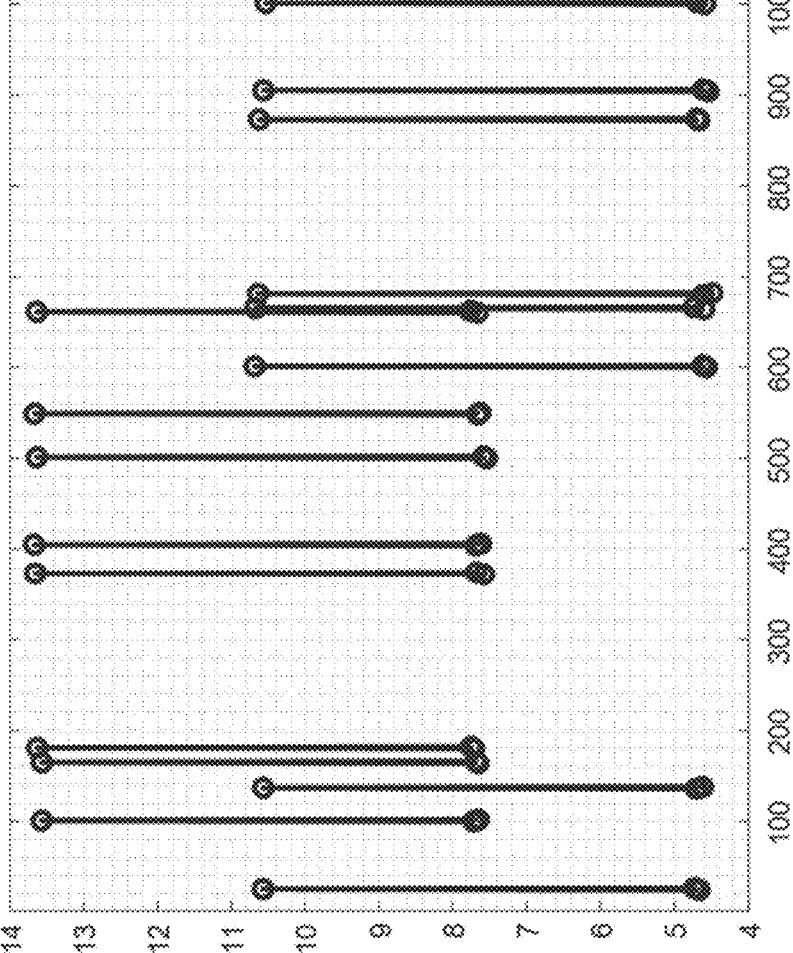
Figure 2:
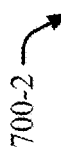
Figures 3, 7:
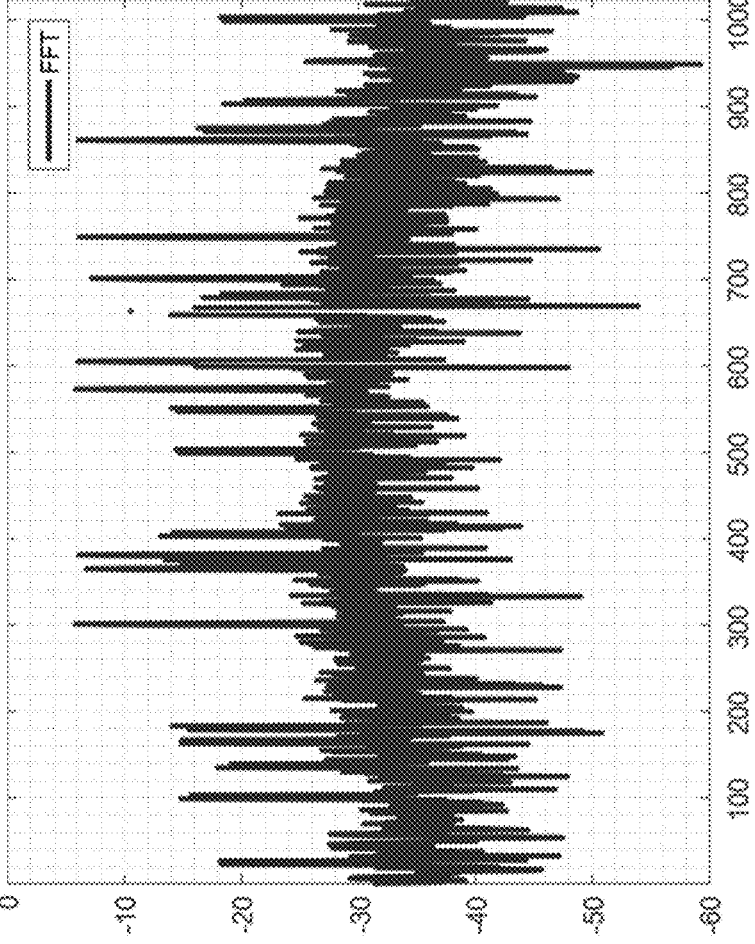
Figures 4, 7:
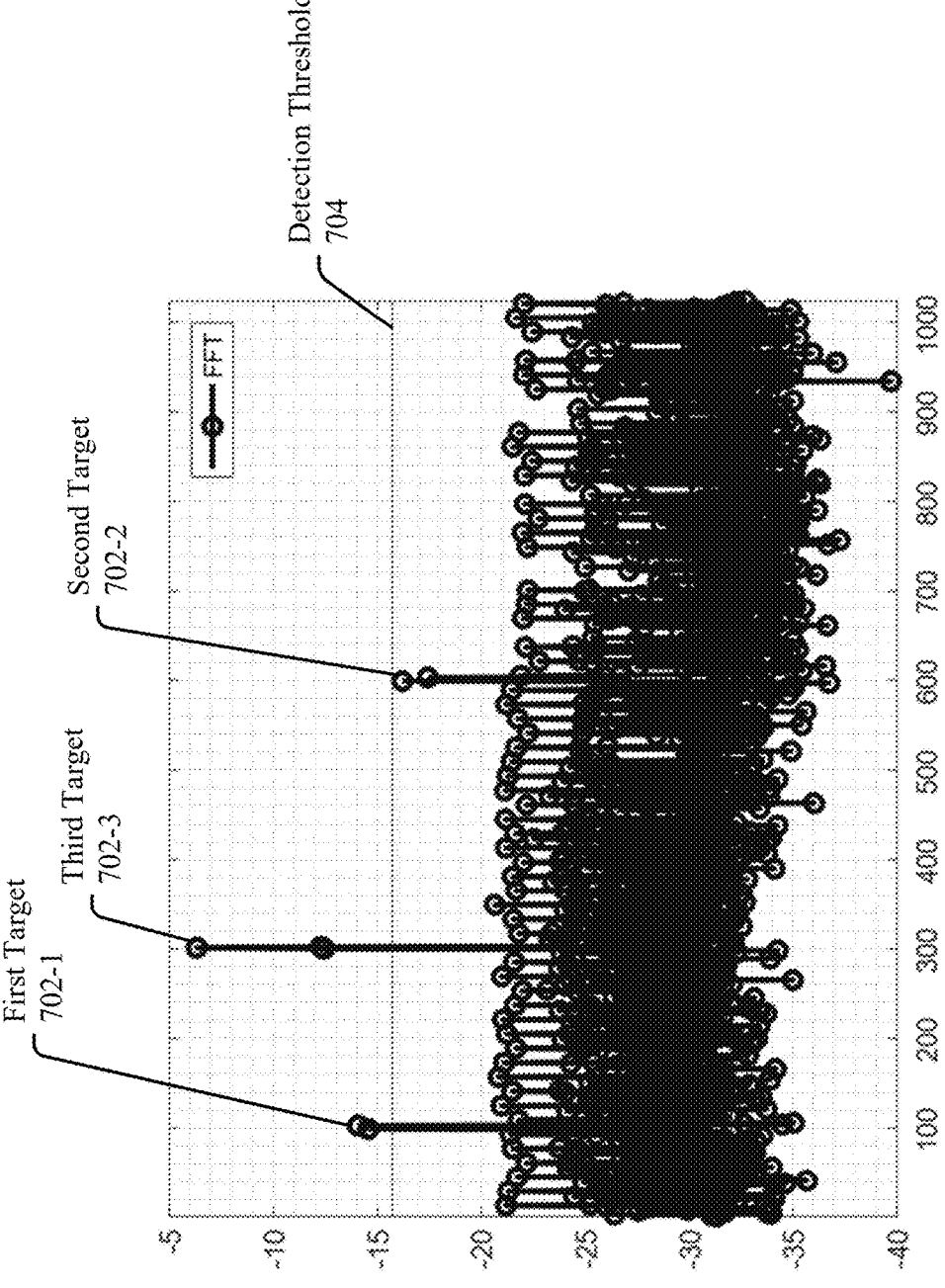
Figures 5, 7:
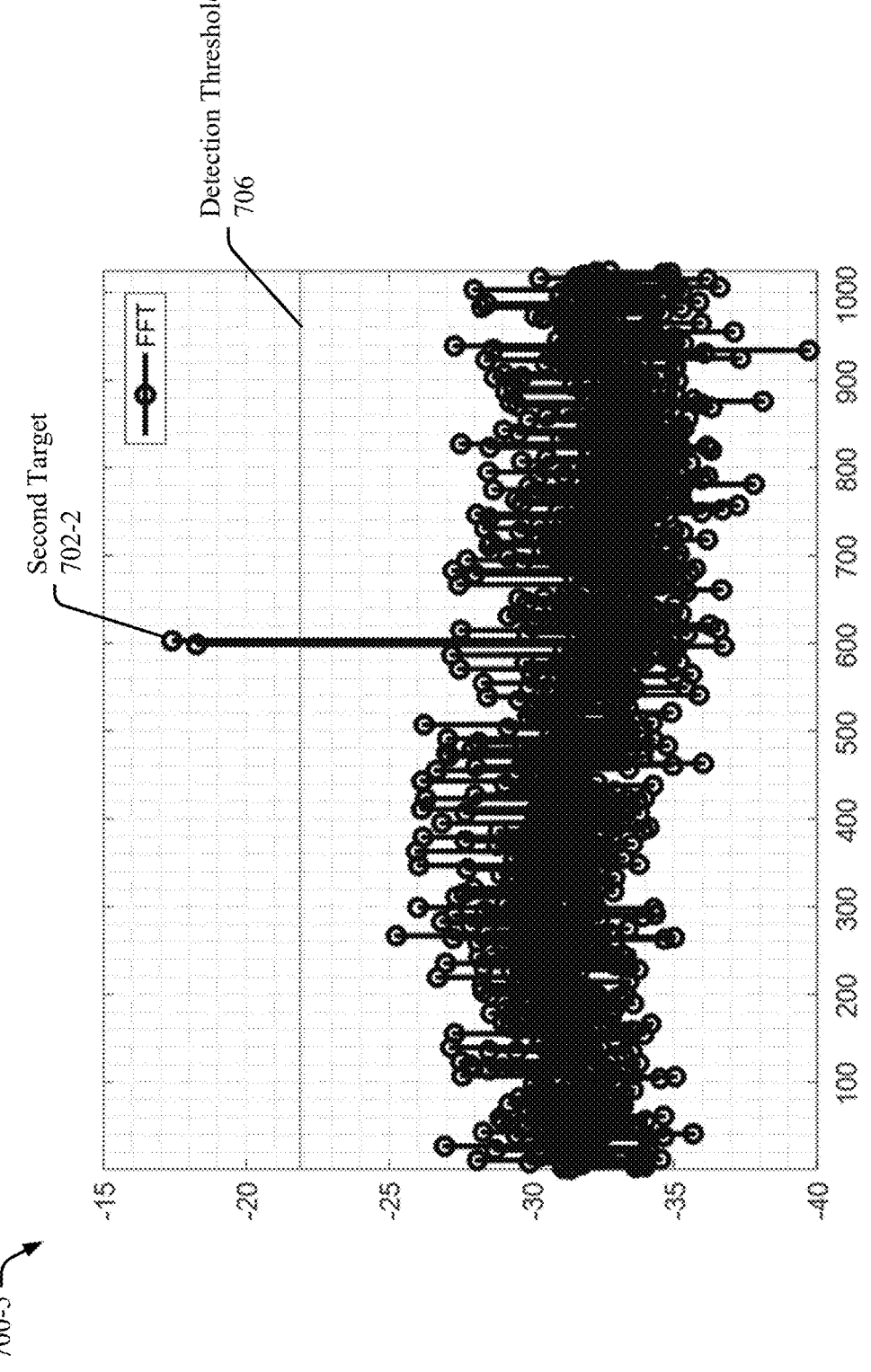
Figures 6, 7:
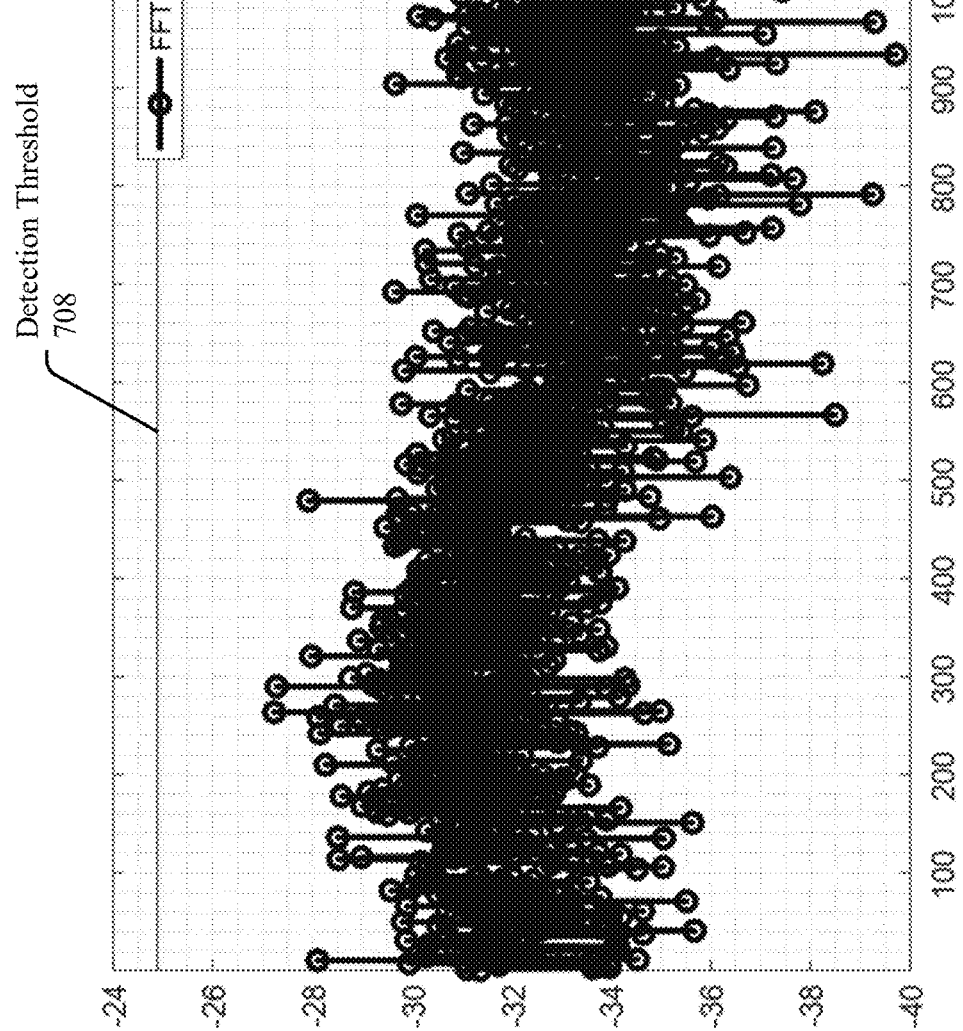
Figure 7:
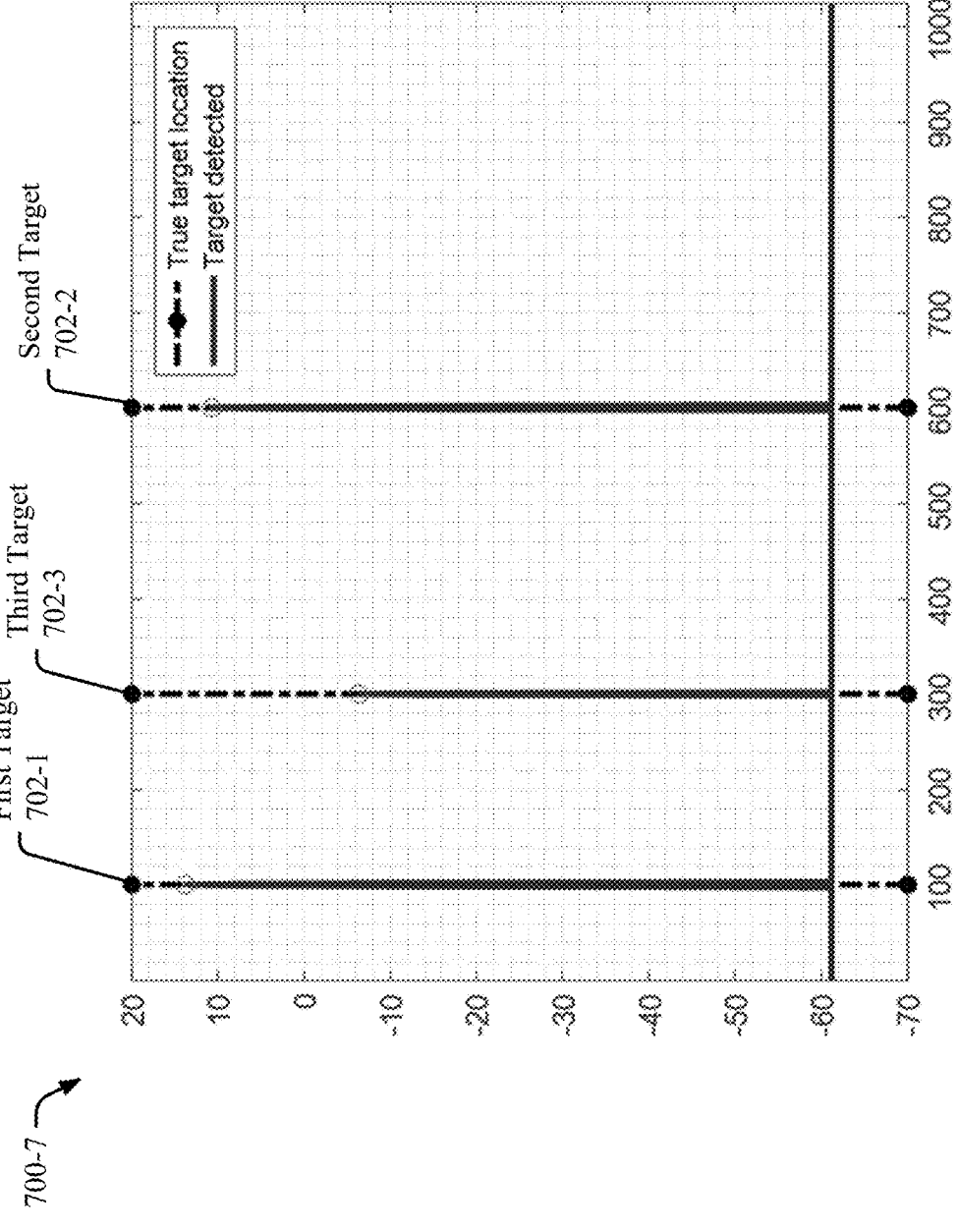

FIG. 6 illustrates an example method 600 for a radar system that uses asymmetrical FDM with polyphase shifters to determine a Doppler frequency of objects. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities. For example, the radar system can be the radar system 104 of FIGS. 1 and 2, the radar system 302 of FIG. 3, the radar system 402 of FIG. 4-1, or the radar system 412 of FIG. 4-2 that determines a Doppler frequency of objects 110 surrounding the vehicle 102.

At 602, the EM signals are transmitted by multiple transmitters of a radar system in an FDM scheme. For example, the transmitters 304 can transmit EM signals in an FDM scheme.

At 604, EM signals reflected by one or more objects are received by multiple receivers of the radar system. For example, the receivers 306 can receive EM signals reflected by the objects 110. The objects 110 can reflect the EM signals transmitted by the transmitters 304. The received EM signals include a number of channels equal to the product of the number of transmitters (e.g., a first number) and the number of receivers (e.g., a second number). The second number can be equal to or different than the first number. The received EM signals include a third number of channels, equal to the product of the first number and the second number. The channels are asymmetrically spaced in a Doppler-frequency spectrum. The multiple transmitters and the multiple receivers can be configured to operate as part of a MIMO radar approach.

The placement of the channels in the frequency spectrum can be done using modular Golomb rulers. For example, the received EM signals can include four channels, where the four channels are located in the frequency spectrum at a product of two times pi divided by 16 ($2\pi/16$) and 0, 2, 5, and 6, respectively, or circular shift equivalents thereof. As another example, the received EM signals can include six channels, where the six channels are located in the frequency spectrum at a product of two times pi divided by 64 ($2\pi/64$) and 0, 16, 20, 33, 38, and 39, respectively, or circular shift equivalents thereof. In another example, the received EM signals can include eight channels, where the eight channels are located in the frequency spectrum at a product of two times pi divided by 64 ($2\pi/64$) and 0, 4, 5, 17, 19, 25, 28, and 35, respectively, or circular shift equivalents thereof. In yet another example, the received EM signals can include twelve channels, where the twelve channels are located in the frequency spectrum at a product of two times pi divided by 256 ($2\pi/256$) and 0, 17, 44, 67, 158, 161, 163, 167, 174, 199, 219, and 238, respectively, or circular shift equivalents thereof. In yet another example, the received EM signals can include sixteen channels, where the sixteen channels are located in the frequency spectrum at a product of two times pi divided by 512 ($2\pi/512$) and 0, 1, 16, 30, 37, 40, 81, 92, 115, 123, 135, 219, 223, 236, 241, and 268, respectively, or circular shift equivalents thereof. In yet another example, the received EM signals can include 24 channels, where the 24 channels are located in the frequency spectrum at a product of two times pi divided by 1024 ($2\pi/1024$) and 0, 9, 33, 37, 38, 97, 122, 129, 140, 142, 152, 191, 205, 208, 252, 278, 286, 326, 332, 353, 368, 384, 403, and 425, respectively, or circular shift equivalents thereof. In yet another example, the received EM signals can include 32 channels, where the 32 channels are located in the frequency spectrum at a product of two times pi divided by 2048 ($2\pi/2048$) and 0, 7, 15, 26, 28, 57, 112, 118, 136, 176, 177, 181, 211, 214, 258, 309, 318, 341, 389, 403, 456, 476, 512, 528, 582, 628, 671, 696, 745, 762, 772, and 784, respectively, or circular shift equivalents thereof.

At 606, multiple polyphase shifters are controlled to introduce a phase shift to the transmitted EM signals or the received EM signals. The multiple polyphase shifters are operably connected to the multiple transmitters or the multiple receivers of the radar system. The phase shift includes one of at least four potential phase shifts that are asymmetrically spaced in a frequency spectrum. For example, the polyphase shifters 308 are operably connected to the transmitters 304 or the receivers 306. The radar system 104 can include a fourth number of polyphase shifters. The fourth number can be equal to the first number or the second number. The processor 118 can control the polyphase shifters 308 to introduce a phase shift to the transmitted EM signals or the received EM signals, wherein the phase shift includes one of at least four potential phase shifts. As described above, the processor 118 can use the polyphase control signal 310 to control the phase shifters 308. The polyphase control signal 310 can be a multiple-bit signal (e.g., 6-bit, 8-bit, 12-bit, 16-bit, 24-bit, or 32-bit), allowing the polyphase shifters 308 to have more than two phase stages. The increased number of potential phase stages provides more flexibility in a coding scheme applied to the transmitted EM signals or received EM signals than binary phase shifters can provide. In addition, the potential phase stages allow the radar system 104 to utilize an asymmetrical FDM scheme.

At 608, a Doppler-frequency spectrum of the received EM signals is determined. For example, the spectrum analysis module 122 or the radar system 104 can determine a Doppler-frequency spectrum of the received EM signals. The spectrum analysis module 122 can generate an estimated EM signal Doppler-frequency spectrum for the peaks and subtract this from the Doppler-frequency spectrum.

At 610, non-coherent integration (NCI) can be performed on the received EM signals to generate an NCI spectrum.

For example, the non-coherent integrator 124 or the radar system 104 can perform NCI on the received EM signals to generate an NCI spectrum. The non-coherent integration can be performed by performing circular shifts on the Doppler-frequency spectrum to align MIMO channels that are shifted or placed by the asymmetrical coding in the Doppler-frequency spectrums of the received EM signals. The number of circular shifts performed can be equal to the number of channels minus one, assuming the first channel (or one of the channels) has not been shifted by the waveform. The non-coherent integrator 124 or the radar system 104 can then determine, across the Doppler-frequency spectrum and the additional Doppler-frequency spectrums of the received EM signals, a sum of EM energy levels at each Doppler bin. The asymmetrical coding in the Doppler-frequency spectrums of the received EM signals results in false peaks not being aligned after the circular shifting.

At 612, a detection threshold for the NCI spectrum can be estimated using the locations of the channels after the circular shift. For example, the non-coherent integrator 124 or the radar system 104 can estimate a detection threshold for the NCI spectrum using the locations of the channels after the circular shift. The detection threshold for the NCI spectrum can be estimated by determining an average EM energy level at particular Doppler bins of the Doppler-frequency spectrum. The particular Doppler bins are located at the locations of the channels after the circular shift. Because the false peaks are not aligned or overlapping after circular shifting, the detection dynamic range of the radar system 104 is improved.

At 614, one or more potential detections of the one or more objects above the detection threshold are identified. For example, the DSP 322 or the processor 118 can identify potential detections associated with the objects 110 that have an EM energy above the detection threshold.

The spectrum analysis module 122, the DSP 322, or the processor 118 can then reconstruct the Doppler-frequency spectrum for the one or more potential detections to generate a detection Doppler-frequency spectrum and subtract the detection Doppler-frequency spectrum from the Doppler-frequency spectrum of the received EM signals to generate an updated Doppler-frequency spectrum of the received EM signals. The DSP 322 or the processor 118 can identify, using the updated Doppler-frequency spectrum, one or more additional potential detections.

The DSP 322 or the processor 118 can identify the one or more additional potential detections by performing NCI on the updated Doppler-frequency spectrum to generate an updated NCI spectrum. An updated detection threshold for the updated NCI spectrum can be estimated using the locations of the channels after the circular shift. The DSP 322 or the processor 118 can then identify the one or more additional potential detections above the updated detection threshold. The DSP 322 or the processor 118 can repeat these steps until the updated Doppler-frequency spectrum does not include EM energy or potential detections above the updated detection threshold. For example, the DSP 322 or the processor 118 can determine whether the updated Doppler-frequency spectrum does not include an additional potential detection above the updated detection threshold. If so, the DSP 322 or the processor 118 can stop or cease the iterative process to identify additional potential detections.

At 618, a Doppler frequency associated with each of the one or more objects is determined based on the potential detections. For example, the DSP 322 or the processor 118 can determine, based on the potential detections, the Doppler frequency associated with the objects 110.

FIGS. 7-1 through 7-7 illustrate Doppler-frequency spectrums 700 from a radar system that uses asymmetrical FDM to determine detections associated with objects. For example, the radar system can be the radar system 104 of FIGS. 1 and 2, the radar system 302 of FIG. 3, the radar system 402 of FIG. 4-1, or the radar system 412 of FIG. 4-2 that determines detections for the objects 110 surrounding the vehicle 102.

FIG. 7-1 illustrates a Doppler-frequency spectrum 700-1 of example received EM signals. The radar system 104 includes eight channels in the received EM signals with six-bit polyphase shifters 308. The channels are located in the Doppler-frequency spectrum at a product of two times pi divided by 64 ($2\pi/64$) and 0, 4, 5, 17, 19, 25, 28, and 35, respectively. The Doppler-frequency spectrum 700-1 includes peaks in the EM energy associated with a first target 702-1, a second target 702-2, and a third target 702-3. The Doppler-frequency spectrum 700-1 also includes ghost peaks from the targets 702.

FIG. 7-2 illustrates a Doppler-frequency spectrum 700-2 that represents an estimated EM signal Doppler spectrum for the peaks in the Doppler-frequency spectrum 700-1. The radar system 104 can identify peaks in the Doppler-frequency spectrum 700-1 and extract the estimate EM signals associated therewith. FIG. 7-3 illustrates a Doppler-frequency spectrum 700-3 that is generated by subtracting the Doppler-frequency spectrum 700-2 from the Doppler-frequency spectrum 700-1.

FIG. 7-4 illustrates a Doppler-frequency spectrum 700-4 that represents Doppler-frequency spectrum after performing non-coherent integration across the channels of the received EM signals. The non-coherent integration can be performed by performing circular shifts on the Doppler-frequency spectrum 700-3 and summing the resultant Doppler-frequency spectrums. The number of circular shifts performed can be equal to the number of channels minus one. In the Doppler-frequency spectrum 700-4, EM energy associated with the first target 702-1 and the third target 702-3 are above a detection threshold 704. The residue level in the Doppler-frequency spectrum 700-4 is suppressed in comparison to the peaks associated with the first target 702-1 and the third target 702-3. The EM energy associated with the second target 702-2 is below the detection threshold and so the second target 702-2 is not identified in this iteration of non-coherent integration.

The non-coherent integrator 124 or the radar system 104 can estimate the detection threshold 704 using the locations of the eight channels after circular shifting and determining an average EM energy level at Doppler bins associated with the locations of the channels of the Doppler-frequency spectrum.

FIG. 7-5 illustrates a Doppler-frequency spectrum 700-5 that represents Doppler-frequency spectrum after performing a second iteration of non-coherent integration across the channels of the received EM signals. After identifying the first target 702-1 and the third target 702-3, the spectrum analysis module 122, the DSP 322, or the processor 118 can then reconstruct the Doppler-frequency spectrum 700-1 for the first target 702-1 and the third target 702-3 and subtract the associated Doppler-frequency spectrum from the Doppler-frequency spectrum 700-1 of the received EM signals to generate an updated Doppler-frequency spectrum. The DSP 322 or the processor 118 can identify, using the updated Doppler-frequency spectrum, one or more additional potential detections (e.g., the second target 702-2) by performing an additional iteration of non-coherent integration until no additional targets are identified. In the Doppler-frequency spectrum 700-5, EM energy associated with the second target 702-2 is above a detection threshold 706. The residue level in the Doppler-frequency spectrum 700-5 is further suppressed in comparison to the Doppler-frequency spectrum 700-4.

FIG. 7-6 illustrates a Doppler-frequency spectrum 700-6 that represents Doppler-frequency spectrum after performing a third iteration of non-coherent integration across the channels of the received EM signals. After identifying the second target 702-2, the spectrum analysis module 122, the DSP 322, or the processor 118 can then reconstruct the Doppler-frequency spectrum 700-1 for the second target 702-2 and subtract the associated Doppler-frequency spectrum from the Doppler-frequency spectrum 700-1 of the received EM signals to generate an updated Doppler-frequency spectrum. In the Doppler-frequency spectrum 700-6, no peaks are identified above a detection threshold 708. The residue level in the Doppler-frequency spectrum 700-6 is further suppressed in comparison to the Doppler-frequency spectrum 700-5.

FIG. 7-7 illustrates a Doppler-frequency spectrum 700-7 that indicates the Doppler frequency associated with the first target 702-1, the second target 702-2, and the third target 702-3.

EXAMPLES

In the following section, examples are provided.

Example 1. A radar system comprising: multiple transmitters configured to transmit electromagnetic (EM) signals in a frequency-division multiplexing (FDM) scheme; multiple receivers configured to receive EM signals reflected by one or more objects; multiple polyphase shifters operably connected to the multiple transmitters or the multiple receivers, the multiple polyphase shifters being configured to introduce at least one of four potential phase shifts, the potential phase shifts being asymmetrically spaced in a frequency spectrum; and a processor configured to control the multiple polyphase shifters to introduce the one of at least four potential phase shifts to at least one of the transmitted EM signals or the received EM signals.

Example 2. The radar system of Example 1, wherein: the multiple transmitters comprise a first number of transmitters; the multiple receivers comprise a second number of receivers, the second number being equal or not equal to the first number; the multiple polyphase shifters comprise a third number of polyphase shifters, the third number being equal to the first number or the second number; and the received EM signals comprise a fourth number of channels, the fourth number being equal to a product of the first number and the second number.

Example 3. The radar system of Example 2, wherein: the multiple polyphase shifters are operably connected to the multiple transmitters; and the third number is equal to the first number.

Example 4. The radar system of Example 2, wherein: the multiple polyphase shifters are operably connected to the multiple receivers; and the third number is equal to the second number.

Example 5. The radar system of any of Examples 2 through 4, wherein the channels of the received EM signals are placed in the frequency spectrum using modular Golomb rulers.

Example 6. The radar system of any of Examples 2 through 5, wherein: the fourth number is equal to four; and the channels of the received EM signals are located in the frequency spectrum at a product of two times pi divided by 16 ($2\pi/16$) and 0, 2, 5, and 6, respectively, or circular shift equivalents thereof.

Example 7. The radar system of any of Examples 2 through 5, wherein: the fourth number is equal to six; and the channels of the received EM signals are located in the frequency spectrum at a product of two times pi divided by 64 ($2\pi/64$) and 0, 16, 20, 33, 38, and 39, respectively, or circular shift equivalents thereof.

Example 8. The radar system of any of Examples 2 through 5, wherein: the fourth number is equal to eight; and the channels of the received EM signals are located in the frequency spectrum at a product of two times pi divided by 64 ($2\pi/64$) and 0, 4, 5, 17, 19, 25, 28, and 35, respectively, or circular shift equivalents thereof.

Example 9. The radar system of any of Examples 2 through 5, wherein: the fourth number is equal to twelve; and the channels of the received EM signals are located in the frequency spectrum at a product of two times pi divided by 256 ($2\pi/256$) and 0, 17, 44, 67, 158, 161, 163, 167, 174, 199, 219, and 238, respectively, or circular shift equivalents thereof.

Example 10. The radar system of any of Examples 2 through 5, wherein: the fourth number is equal to sixteen; and the channels of the received EM signals are located in the frequency spectrum at a product of two times pi divided by 512 ($2\pi/512$) and 0, 1, 16, 30, 37, 40, 81, 92, 115, 123, 135, 219, 223, 236, 241, and 268, respectively, or circular shift equivalents thereof.

Example 11. The radar system of any of Examples 2 through 5, wherein: the fourth number is equal to 24; and the channels of the received EM signals are located in the frequency spectrum at a product of two times pi divided by 1024 ($2\pi/1024$) and 0, 9, 33, 37, 38, 97, 122, 129, 140, 142, 152, 191, 205, 208, 252, 278, 286, 326, 332, 353, 368, 384, 403, and 425, respectively, or circular shift equivalents thereof.

Example 12. The radar system of any of Examples 2 through 5, wherein: the fourth number is equal to 32; and the channels of the received EM signals are located in the frequency spectrum at a product of two times pi divided by 2048 ($2\pi/2048$) and 0, 7, 15, 26, 28, 57, 112, 118, 136, 176, 177, 181, 211, 214, 258, 309, 318, 341, 389, 403, 456, 476, 512, 528, 582, 628, 671, 696, 745, 762, 772, and 784, respectively, or circular shift equivalents thereof.

Example 13. The radar system of any preceding example, wherein the multiple transmitters and the multiple receivers are configured to operate as part of a multiple-input and multiple-output (MIMO) radar approach.

Example 14. The radar system of any preceding example, wherein the radar system is configured to be installed on an automobile.

Example 15. A computer-readable storage media comprising computer-executable instructions that, when executed, cause a processor of a radar system to: transmit, via multiple transmitters of the radar system, electromagnetic (EM) signals in a frequency-division multiplexing (FDM) scheme; receive, via multiple receivers of the radar system, EM signals reflected by one or more objects; and control multiple polyphase shifters to introduce a phase shift to at least one of the transmitted EM signals or the received EM signals, the multiple polyphase shifters being operably connected to the multiple transmitters or the multiple receivers, the introduced phase shift comprising one of at least four potential phase shifts that are asymmetrically spaced in a frequency spectrum.

Example 16. The computer-readable storage media of Example 15, wherein: the multiple transmitters comprise a first number of transmitters; the multiple receivers comprise a second number of receivers, the second number being equal or not equal to the first number; the multiple polyphase shifters comprise a third number of polyphase shifters, the third number being equal to the first number or the second number; and the received EM signals comprise a fourth number of channels, the fourth number being equal to a product of the first number and the second number.

Example 17. The computer-readable storage media of Example 16, wherein the channels of the received EM signals are placed in the frequency spectrum using modular Golomb rulers.

Example 18. The computer-readable storage media of Example 16 or 17, wherein: the fourth number is equal to six; and the channels of the received EM signals are located in the frequency spectrum at a product of two times pi divided by 64 ($2\pi/64$) and 0, 16, 20, 33, 38, and 39, respectively, or circular shift equivalents thereof.

Example 19. The computer-readable storage media of Example 16 or 17, wherein: the fourth number is equal to eight; and the channels of the received EM signals are located in the frequency spectrum at a product of two times pi divided by 64 ($2\pi/64$) and 0, 4, 5, 17, 19, 25, 28, and 35, respectively, or circular shift equivalents thereof.

Example 20. The computer-readable storage media of Example 16 or 17, wherein: the fourth number is equal to twelve; and the channels of the received EM signals are located in the frequency spectrum at a product of two times pi divided by 256 ($2\pi/256$) and 0, 17, 44, 67, 158, 161, 163, 167, 174, 199, 219, and 238, respectively, or circular shift equivalents thereof.

Example 21. A method comprising: transmitting, via multiple transmitters of a radar system, electromagnetic (EM) signals in a frequency-division multiplexing (FDM) scheme; receiving, via multiple receivers of the radar system, EM signals reflected by one or more objects; and controlling multiple polyphase shifters to introduce a phase shift to at least one of the transmitted EM signals or the received EM signals, the multiple polyphase shifters being operably connected to the multiple transmitters or the multiple receivers, the introduced phase shift comprising one of at least four potential phase shifts that are asymmetrically spaced in a frequency spectrum.

Example 22. A radar system comprising: a first number of receivers configured to receive electromagnetic (EM) signals reflected by one or more objects, the EM signals being transmitted by a second number of transmitters in a frequency-division multiplexing (FDM) scheme, the second number being equal to or not equal to the first number, the received EM signals comprising a third number of channels, the third number being equal to a product of the first number and the second number, the received EM signals including asymmetrically-spaced phase shifts among the channels in a frequency spectrum; and a processor configured to: determine a Doppler-frequency spectrum of the received EM signals; perform non-coherent integration (NCI) on the received EM signals to generate an NCI spectrum; estimate, using locations of the channels after circular shifting, a detection threshold for the NCI spectrum; identify one or more potential detections of the one or more objects above the detection threshold; and determine, based on the potential detections, a Doppler frequency associated with each of the one or more objects.

Example 23. The radar system of Example 22, wherein: the phase shifts are introduced by the first number of polyphase shifters operably connected to the receivers.

Example 24. The radar system of Example 22, wherein: the phase shifts are introduced by the second number of polyphase shifters being operably connected to the transmitters.

Example 25. The radar system of any of Examples 22 through 24, wherein the processor is configured to perform the NCI on the received EM signals by: performing a particular number of circular shifts on the Doppler-frequency spectrum to align the channels in the Doppler-frequency spectrums of the received EM signals, the particular number being equal to the third number minus one; and determining, across the Doppler-frequency spectrum and the additional Doppler-frequency spectrums of the received EM signals, a sum of EM energy levels at each Doppler bin.

Example 26. The radar system of any of Examples 22 through 25, wherein the processor is configured to estimate the detection threshold for the NCI spectrum by determining an average EM energy level at particular Doppler bins of the Doppler-frequency spectrum, the particular Doppler bins being located at the locations of the channels.

Example 27. The radar system of any of Examples 22 through 26, wherein the processor is further configured to: reconstruct the Doppler-frequency spectrum for the one or more potential detections to generate a detection Doppler-frequency spectrum; subtract the detection Doppler-frequency spectrum from the Doppler-frequency spectrum of the received EM signals to generate an updated Doppler-frequency spectrum of the received EM signals; and identify, using the updated Doppler-frequency spectrum, one or more additional potential detections.

Example 28. The radar system of Example 27, wherein the processor is configured to identify the one or more additional potential detections by: performing non-coherent integration (NCI) on the updated Doppler-frequency spectrum to generate an updated NCI spectrum; estimating, using the locations of the channels, an updated detection threshold for the updated NCI spectrum; and identifying the one or more additional potential detections above the updated detection threshold.

Example 29. The radar system of Example 28, wherein the processor is further configured to: determine whether the updated Doppler-frequency spectrum does not include an additional potential detection above the updated detection threshold; and responsive to determining that the updated Doppler-frequency spectrum does not include an additional potential detection above the updated detection threshold, cease process to identify one or more additional potential detections.

Example 30. The radar system of any of Examples 22 through 29, wherein: the third number is equal to four; and the channels of the received EM signals are located in the frequency spectrum at a product of two times pi divided by 16 ($2\pi/16$) and 0, 2, 5, and 6, respectively, or circular shift equivalents thereof.

Example 31. The radar system of any of Examples 22 through 29, wherein: the third number is equal to six; and the channels of the received EM signals are located in the frequency spectrum at a product of two times pi divided by 64 ($2\pi/64$) and 0, 16, 20, 33, 38, and 39, respectively, or circular shift equivalents thereof.

Example 32. The radar system of any of Examples 22 through 29, wherein: the third number is equal to eight; and the channels of the received EM signals are located in the frequency spectrum at a product of two times pi divided by 64 (2π/64) and 0, 4, 5, 17, 19, 25, 28, and 35, respectively, or circular shift equivalents thereof.

Example 33. The radar system of any of Examples 22 through 29, wherein: the third number is equal to twelve; and the channels of the received EM signals are located in the frequency spectrum at a product of two times pi divided by 256 (2π/256) and 0, 17, 44, 67, 158, 161, 163, 167, 174, 199, 219, and 238, respectively, or circular shift equivalents thereof.

Example 34. The radar system of any of Examples 22 through 29, wherein: the third number is equal to sixteen; and the channels of the received EM signals are located in the frequency spectrum at a product of two times pi divided by 512 (2π/512) and 0, 1, 16, 30, 37, 40, 81, 92, 115, 123, 135, 219, 223, 236, 241, and 268, respectively, or circular shift equivalents thereof.

Example 35. The radar system of any of Examples 22 through 29, wherein: the third number is equal to 24; and the channels of the received EM signals are located in the frequency spectrum at a product of two times pi divided by 1024 (2π/1024) and 0, 9, 33, 37, 38, 97, 122, 129, 140, 142, 152, 191, 205, 208, 252, 278, 286, 326, 332, 353, 368, 384, 403, and 425, respectively, or circular shift equivalents thereof.

Example 36. The radar system of any of Examples 22 through 29, wherein: the fourth number is equal to 32; and the channels of the received EM signals are located in the frequency spectrum at a product of two times pi divided by 2048 (2π/2048) and 0, 7, 15, 26, 28, 57, 112, 118, 136, 176, 177, 181, 211, 214, 258, 309, 318, 341, 389, 403, 456, 476, 512, 528, 582, 628, 671, 696, 745, 762, 772, and 784, respectively, or circular shift equivalents thereof.

Example 37. The radar system of any of Examples 22 through 36, wherein the transmitters and the receivers operate as part of a multiple-input and multiple-output (MIMO) radar approach.

Example 38. The radar system of any of Examples 22 through 37, wherein the radar system is configured to be installed on an automobile.

Example 39. A computer-readable storage media comprising computer-executable instructions that, when executed, cause a processor of a radar system to: receive, via a first number of receivers, electromagnetic (EM) signals reflected by one or more objects, the EM signals being transmitted by a second number of transmitters in a frequency-division multiplexing (FDM) scheme, the second number being equal to or not equal to the first number, the received EM signals comprising a third number of channels, the third number being equal to a product of the first number and the second number, the received EM signals including asymmetrically-spaced phase shifts among the channels in a frequency spectrum; determine a Doppler-frequency spectrum of the received EM signals; perform non-coherent integration (NCI) on the received EM signals to generate an NCI spectrum; estimate, using locations of the channels after circular shifting, a detection threshold for the NCI spectrum; identify one or more potential detections of the one or more objects above the detection threshold; and determine, based on the potential detections, a Doppler frequency associated with each of the one or more objects.

Example 40. A method comprising: receiving, via a first number of receivers, electromagnetic (EM) signals reflected by one or more objects, the EM signals being transmitted by a second number of transmitters in a frequency-division multiplexing (FDM) scheme, the second number being equal to or not equal to the first number, the received EM signals comprising a third number of channels, the third number being equal to a product of the first number and the second number, the received EM signals including asymmetrically-spaced phase shifts among the channels in a frequency spectrum; determining a Doppler-frequency spectrum of the received EM signals; performing non-coherent integration (NCI) on the received EM signals to generate an NCI spectrum; estimating, using locations of the channels after circular shifting, a detection threshold for the NCI spectrum; identifying one or more potential detections of the one or more objects above the detection threshold; and determining, based on the potential detections, a Doppler frequency associated with each of the one or more objects.

Example 41. The method of Example 40, wherein performing the NCI on the received EM signals comprises: performing a particular number of circular shifts on the Doppler-frequency spectrum to align the channels in the Doppler-frequency spectrums of the received EM signals, the particular number being equal to the third number minus one; and determining, across the Doppler-frequency spectrum and the additional Doppler-frequency spectrums of the received EM signals, a sum of EM energy levels at each Doppler bin.

Example 42. The method of Example 40 or 41, wherein the method further comprises: reconstructing the Doppler-frequency spectrum for the one or more potential detections to generate a detection Doppler-frequency spectrum; subtracting the detection Doppler-frequency spectrum from the Doppler-frequency spectrum of the received EM signals to generate an updated Doppler-frequency spectrum of the received EM signals; and identifying, using the updated Doppler-frequency spectrum, one or more additional potential detections.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A radar system comprising:

multiple transmitters configured to transmit electromagnetic (EM) signals in a frequency-division multiplexing (FDM) scheme;

multiple receivers configured to receive EM signals reflected by one or more objects;

multiple polyphase shifters operably connected to the multiple transmitters or the multiple receivers, the multiple polyphase shifters having multiple output stages and being configured to, based on a polyphase control signal, introduce multiple phase shifts, the phase shifts being asymmetrically spaced in a frequency spectrum; and a processor configured to, via the polyphase control signal, control the output stage of each of the multiple polyphase shifters and introduce the phase shifts to at least one of the transmitted EM signals or the received EM signals, wherein the processor is configured to add a progressive phase modulation ø to transmitted EM signal signals, which asymmetrically shifts frequency or Doppler frequency of reflected EM signals by an offset frequency $\omega_c$, which is equal to the product of two, pi, and the progressive phase modulation $\omega_c = 2\pi\varphi$.

2. The radar system of claim 1, wherein:

the multiple transmitters comprise a first number of transmitters;

the multiple receivers comprise a second number of receivers, the second number being equal or the first number;

the multiple polyphase shifters comprise a third number of polyphase shifters, the third number being equal to the first number or the second number; and the received EM signals comprise a fourth number of channels, the fourth number being equal to a product of the first number and the second number.

3. The radar system of claim 2, wherein:

the multiple polyphase shifters are operably connected to the multiple transmitters; and the third number is equal to the first number.

4. The radar system of claim 2, wherein:

the multiple polyphase shifters are operably connected to the multiple receivers; and the third number is equal to the second number.

5. The radar system of claim 2, wherein the channels of the received EM signals are placed in the frequency spectrum using modular Golomb rulers.

6. The radar system of claim 2, wherein:

the fourth number is equal to four; and the channels of the received EM signals are located in the frequency spectrum at a product of two times pi divided by 16 ($2\pi/16$) and 0, 2, 5, and 6, respectively.

7. The radar system of claim 2, wherein:

the fourth number is equal to six; and the channels of the received EM signals are located in the frequency spectrum at a product of two times pi divided by 64 ($2\pi/64$) and 0, 16, 20, 33, 38, and 39, respectively.

8. The radar system of claim 2, wherein:

the fourth number is equal to eight; and the channels of the received EM signals are located in the frequency spectrum at a product of two times pi divided by 64 ($2\pi/64$) and 0, 4, 5, 17, 19, 25, 28, and 35, respectively.

9. The radar system of claim 2, wherein:

the fourth number is equal to twelve; and the channels of the received EM signals are located in the frequency spectrum at a product of two times pi divided by 256 ($2\pi/256$) and 0, 17, 44, 67, 158, 161, 163, 167, 174, 199, 219, and 238, respectively.

10. The radar system of claim 2, wherein:

the fourth number is equal to sixteen; and the channels of the received EM signals are located in the frequency spectrum at a product of two times pi divided by 512 ($2\pi/512$) and 0, 1, 16, 30, 37, 40, 81, 92, 115, 123, 135, 219, 223, 236, 241, and 268, respectively.

11. The radar system of claim 2, wherein:

the fourth number is equal to 24; and the channels of the received EM signals are located in the frequency spectrum at a product of two times pi divided by 1024 ($2\pi/1024$) and 0, 9, 33, 37, 38, 97, 122, 129, 140, 142, 152, 191, 205, 208, 252, 278, 286, 326, 332, 353, 368, 384, 403, and 425, respectively.

12. The radar system of claim 2, wherein:

the fourth number is equal to 32; and the channels of the received EM signals are located in the frequency spectrum at a product of two times pi divided by 2048 ($2\pi/2048$) and 0, 7, 15, 26, 28, 57, 112, 118, 136, 176, 177, 181, 211, 214, 258, 309, 318, 341, 389, 403, 456, 476, 512, 528, 582, 628, 671, 696, 745, 762, 772, and 784, respectively.

13. The radar system of claim 1, wherein the multiple transmitters and the multiple receivers are configured to operate as part of a multiple-input and multiple-output (MIMO) radar approach.

14. The radar system of claim 1, wherein the radar system is configured to be installed on an automobile.

15. A non-transitory computer-readable storage medium comprising computer-executable instructions that, when executed, cause a processor of a radar system to:

transmit, via multiple transmitters of the radar system, electromagnetic (EM) signals in a frequency-division multiplexing (FDM) scheme;

receive, via multiple receivers of the radar system, EM signals reflected by one or more objects;

via a polyphase control signal, control output stages of each of multiple polyphase shifters connected to the multiple transmitters or the multiple receivers, the multiple polyphase shifters having multiple output stages and being configured to, based on the polyphase control signal, introduce multiple phase shifts, the phase shifts being asymmetrically spaced in a frequency spectrum; and add a progressive phase modulation # to transmitted EM signal signals, which asymmetrically shifts frequency or Doppler frequency of reflected EM signals by an offset frequency $\omega_c$, which is equal to the product of two, pi, and the progressive phase modulation $\omega_c = 2\pi\varphi$.

16. The non-transitory computer-readable storage media of claim 15, wherein:

the multiple transmitters comprise a first number of transmitters;

the multiple receivers comprise a second number of receivers, the second number being equal to the first number;

the multiple polyphase shifters comprise a third number of polyphase shifters, the third number being equal to the first number or the second number; and the received EM signals comprise a fourth number of channels, the fourth number being equal to a product of the first number and the second number.

17. The non-transitory computer-readable storage media of claim 16, wherein the channels of the received EM signals are placed in the frequency spectrum using modular Golomb rulers.

18. The non-transitory computer-readable storage media of claim 16, wherein:

the fourth number is equal to four; and the channels of the received EM signals are located in the frequency spectrum at a product of two times pi divided by 16 ($2\pi/16$) and 0, 2, 5, and 6, respectively, or circular shift equivalents thereof.

19. The non-transitory computer-readable storage media of claim 16, wherein:

the fourth number is equal to six; and the channels of the received EM signals are located in the frequency spectrum at a product of two times pi divided by 64 ($2\pi/64$) and 0, 16, 20, 33, 38, and 39, respectively, or circular shift equivalents thereof.

20. A method comprising:

transmitting, via multiple transmitters of a radar system, electromagnetic (EM) signals in a frequency-division multiplexing (FDM) scheme;

receiving, via multiple receivers of the radar system, EM signals reflected by one or more objects;

via a polyphase control signal, controlling output stages of each of multiple polyphase shifters connected to the multiple transmitters or the multiple receivers, the multiple polyphase shifters having multiple output stages and being configured to, based on the polyphase control signal, introduce multiple phase shifts, the phase shifts being asymmetrically spaced in a frequency spectrum; and add a progressive phase modulation $\phi$ to transmitted EM signal signals, which asymmetrically shifts frequency or Doppler frequency of reflected EM signals by an offset frequency $\omega_c$, which is equal to the product of two, pi, and the progressive phase modulation $\omega_c = 2\pi\phi$.

\* \* \* \* \*